(12) United States Patent  
Tamura et al.

(10) Patent No.: US 9,198,066 B2
(45) Date of Patent: Nov. 24, 2015

(54) WIRELESS COMMUNICATION DEVICE, WIRELESS COMMUNICATION TERMINAL, REFERENCE SIGNAL TRANSMISSION CONTROL METHOD, AND REFERENCE SIGNAL PROCESSING METHOD

(71) Applicant: Panasonic Corporation, Osaka (JP)

(72) Inventors: Takashi Tamura, Kanagawa (JP); Ayako Horiuchi, Kanagawa (JP); Akihiko Nishio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/131,893

(22) PCT Filed: Dec. 11, 2012

(86) PCT No.: PCT/JP2012/007910
§ 371 (c)(1),
(2) Date: Jan. 9, 2014

(87) PCT Pub. No.: WO2013/128528
PCT Pub. Date: Sep. 6, 2013

(65) Prior Publication Data
US 2014/0169201 A1    Jun. 19, 2014

(30) Foreign Application Priority Data
Feb. 29, 2012 (JP) .................. 2012-044347

(51) Int. Cl.
*H04W 24/08*    (2009.01)
*H04L 5/00*    (2006.01)
(Continued)

(52) U.S. Cl.
CPC ............. *H04W 24/08* (2013.01); *H04L 5/0037* (2013.01); *H04W 36/0094* (2013.01); *H04L 5/0091* (2013.01); *H04W 48/16* (2013.01)

(58) Field of Classification Search
USPC ......... 370/209, 252, 312, 318, 324, 328, 329, 370/330, 345
See application file for complete search history.

(56) References Cited

U.S. PATENT DOCUMENTS

2010/0177746 A1*    7/2010    Gorokhov et al. ............ 370/336
2010/0322227 A1*    12/2010    Luo .............................. 370/345
(Continued)

OTHER PUBLICATIONS

Ericsson, ST-Ericsson, Discussion on design principles for additional carrier types, 3GPP TSG RAN WG1, Meeting #66bis R1-112925, Oct. 10, 2011.

(Continued)

*Primary Examiner* — Edan Orgad
*Assistant Examiner* — Saumit Shah
(74) *Attorney, Agent, or Firm* — Pearne & Gordon LLP

(57) ABSTRACT

A wireless communication device transmitting a reference signal with which a wireless communication terminal measures reception power from a communication cell, in a resource of a data region, includes a control section that determines the resource of the data region in which a reference signal specific to the wireless communication terminal is placed, and a wireless transmission section that transmits the reference signal in the resource determined by the control section. Provided is a wireless communication device transmitting a reference signal by which a wireless communication terminal measures reception power from a communication cell.

14 Claims, 19 Drawing Sheets

(51) Int. Cl.
*H04W 36/00* (2009.01)
*H04W 48/16* (2009.01)

(56) References Cited

U.S. PATENT DOCUMENTS

2011/0268062 A1* 11/2011 Ji et al. .................... 370/329
2012/0207099 A1* 8/2012 Lindh et al. ................ 370/329

OTHER PUBLICATIONS

Nokia, Nokia Siemens Networks, Demodulation reference signal for E-PDCCH, 3GPP TSG RAN WG1, Meeting #68 R1-120732, Feb. 6, 2012.

Research in Motion, UK Limited, E-PDCCH Transmission with DMRS as Demodulation RS, 3GPP TSG RAN WG1, Meeting #67, R1-113958, Nov. 14, 2011.

3GPP TS36.216 v10.1.0, "Physical layer for relaying operation", Dec. 2010.

3GPP TS36.211 v10.4.0, "Evolved Universal Terrestrial Radio Access (E-UTRA) Physical Channels and Modulation", Dec. 2011.

3GPP TS36.304 v10.4.0, "Evolved Universal Terrestrial Radio Access (E-UTRA) User Equipment (UE) procedures in idle mode", Dec. 2011.

3GPP RAN TSG WG1, R1-113675, "Further details on design principles for additional carrier types", Ericsson, ST-Ericsson, San Francisco, USA, Nov. 14-18, 2011.

3GPP RAN WG1, R1-114071, "Issues Regarding Additional Carrier Type in Rel-11 CA", NTT DOCOMO, San Francisco, USA, Nov. 14-18, 2011.

International Search Report for Application No. PCT/JP2012/007910 dated Jan. 29, 2013.

* cited by examiner

WIRELESS COMMUNICATION DEVICE, WIRELESS COMMUNICATION TERMINAL, REFERENCE SIGNAL TRANSMISSION CONTROL METHOD, AND REFERENCE SIGNAL PROCESSING METHOD

TECHNICAL FIELD

The present invention relates to a wireless communication device to which a wireless communication terminal transmits a reference signal for measuring reception power from a communication cell, a wireless communication terminal, a reference signal transmission control method and a reference signal processing method.

BACKGROUND ART

As a next generation communication standard that is compatible with a Long Term Evolution (LTE) system, the 3rd Generation Partnership Project (3GPP), which is the standardization organization, is promoting the standardization of Long Term Evolution Advanced (LTE-Advanced: LTE-A). In the LTE system, a wireless communication device (hereinafter, also referred to as "Network Entity (NE)") of a network (Evolved Universal Terrestrial Radio Access Network: E-UTRAN) provides one or more communication cells.

The wireless communication device is a device such as a wireless communication base station (E-UTRAN NodeB: eNB), a remote base station (Remote Radio Head: RRH), or a relay device (relay node or repeater), which serves as an access point of a wireless communication terminal (User Equipment: UE). The wireless communication terminal belongs to one communication cell among one or more communication cells provided by the wireless communication device. In addition, the wireless communication terminal may use a plurality of frequencies and belong to a plurality of communication cells. Further, the wireless communication terminal may perform transmission and reception with a plurality of communication cells of one frequency. Hereinafter, the wireless communication device is referred to as a "base station", the wireless communication terminal is referred to as a "terminal", and the communication cell is referred to as a "cell".

In the LTE system, a DL grant (also referred to as DL assignment) instructing data assignment of DownLink (DL) to the terminal from the base station and a UL grant instructing data assignment of UpLink (UP) to the base station from the terminal are transmitted, using a Physical Downlink Control Channel (PDCCH). The DL grant notifies a DL resource allocated to a terminal, in a subframe to which the DL grant is transmitted. On the other hand, the UL grant has different subframes for a resource allocated to a terminal in a Frequency Division Duplex (FDD) system and a Time Division Duplex (TDD) system. In the FDD system, the UL grant notifies a UL resource allocated to a terminal, in a target subframe after 4 subframes from the subframe to which the UL grant is transmitted. Further, in the TDD system, the UL grant notifies a UL resource allocated to a terminal, in a target subframe after 4 or more subframes from the subframe to which the UL grant is transmitted. In the TDD system, as the allocation target subframe for the terminal, after how many subframes from the subframe, to which the UL grant is transmitted, a subframe is allocated is determined in response to a pattern in which an uplink line and a downlink line are time-divided (hereinafter, referred to as "UL/DL configuration pattern"). However, even in any UL/DL configuration pattern, the UL subframe is the subframe after 4 or more subframes from the subframe to which the UL grant is transmitted.

The terminal performs blind decoding (BD) on the common search space which is in the PDCCH region and the UE specific search space and knows whether or not a control signal required by the terminal is transmitted. The control signals for all terminals are transmitted in the common search space, and the control signal for each terminal is transmitted in the UE specific search space.

In the LTE-Advanced system, with the increase in the number of terminals to be connected to a single cell or the increase in the amount of communication packets at each terminal, there is concern of resource shortage of a PDCCH region. If the base station cannot map to the PDCCH, a control signal instructing a data assignment for the terminal due to the shortage of resources of a PDCCH region, the data assignment for the terminal is not performed. In this case, even if the resources of a Physical Downlink Shared Channel (PDSCH) region to which data is mapped is not occupied, the resources cannot be used, and thus there is a concern that the system throughput is reduced.

As a method to resolve the resource shortage in the PDCCH region, it is considered that a control signal addressed to the terminal under the base station is placed also in the resource used as a data region (for example, a PDSCH region). A new region, to which the control signal addressed to the terminal under the base station is mapped, is referred to as an Enhanced PDCCH (ePDCCH) region, a New-POOCH (N-PDCCH) region, an X-PDCCH region, or the like. Further, a relay technology is introduced to the LTE-Advanced system, and the control signal for a relay device is placed in the data region. Since there is a possibility that the control signal for the relay device is extended and used as the control signal for the terminal, the region in which the control signal is placed is also referred to as an R-PDCCH (POOCH for a relay device). It is possible to increase the number of control signals by increasing the number of the new regions in which the control signal is placed as described above. Further, by changing between cells a new region (hereinafter, also referred to as "ePDCCH") other than the PDCCH region to which the control signal is transmitted, a transmission power control for the control signal transmitted to a terminal located in the vicinity of the cell edge, an interference control of applying a transmitted control signal to other cells, or an interference control of applying the control signal from other cells to its own cell can be realized.

In the LTE-Advanced system, a region (R-PDCCH region) in which the control signal for the relay device is placed is provided in the data region (for example, PDSCH region). The DL grant and the UL grant are placed also in the R-PDCCH similarly to the PDCCH. Further, in the R-PDCCH, the DL grant is placed in a first slot and the UL grant is placed in a second slot (see NPL 1). Since the decoding delay of the DL grant is reduced by placing the DL grant only in the first slot, the relay device can be ready for the transmission of an ACK/NACK for the DL data (transmitted after 4 subframes from receiving the DL grant, in the FDD). If "relay device subframe configuration (RN subframe Config)" is transmitted from the base station in a Radio Resource Control (RRC) layer, the relay device determines the allocated resource (search space) of the R-PDCCH region based on the R-PDCCH configuration (rpdcch Config) included in the configuration information. Further, the relay device receives a control signal transmitted from the base station in the R-PDCCH region.

[Description of Resource]

In the LTE system and the LTE-Advanced system, one Resource Block (RB) is "12 subcarriers×0.5 msec", and a unit of a combination of two RBs on a time axis is termed a RB pair. Accordingly, the RB pair is "12 subcarriers×1 msec". In a case of representing a set of 12 subcarriers on the frequency axis, the RB pair is simply termed a RB. Further, the RB pair is termed a Physical RB (PRB) pair in a physical layer. Further, a unit of "one subcarrier×one OFDM symbol" is termed a Resource Element (RE). The number of OFDM symbols per one RB pair changes depends on the length of the Cyclic Prefix (CP) of an OFDM symbol. The number of REs of the region, in which the ePDCCH is placed, per one RB pair is different depending on the number of OFDM symbols or the number of REs used for the Reference Signal (RS). However, the number of OFDM symbols which can be used and the reference signal change in each subframe. Accordingly, the reception quality of the ePDCCH is reduced in the subframe having a small number of REs which can be used. Further, in a case where the PDCCH region is not used for the ePDCCH, the number of OFDM symbols which can be used in the ePDCCH is reduced depending on the number of OFDM symbols in the PDCCH region. The number of OFDM symbols used in PDCCH is 1 to 4.

[Description of Reference Signals]

The reference signal has the following main three types. The first type is a Cell specific Reference Signal (CRS). The CRS is transmitted using a specific RE in all RBs. However, the CRS is transmitted also in the data region in subframes other than a Multimedia Broadcast multicast service Single Frequency Network (MBSFN) subframe, but is transmitted only in the first two OFDM symbols in the MBSFN subframe. Further, in the CRS, the RE to be placed is determined by the cell ID.

The second type is a UE specific Reference Signal (DMRS). The DMRS is transmitted for decoding the PDSCH. The antenna port of the DMRS to be dynamically used in the DL assignment is indicated to the terminal. Consequently, the base station can indicate different numbers of DMRS for each terminal. Further, the DMRS is transmitted in the data region (see NPL 2).

The third type is a Channel State Information Reference Signal (CSI-RS). In the CSI-RS, although the resource that can be transmitted by the base station is defined in advance, it is possible to change the resource to be actually transmitted, in each cell. The terminal can know an interval and a resource to be transmitted, based on the specific control information transmitted in a RRC layer.

Further, the PDCCH and the R-PDCCH have four levels including levels 1, 2, 4 and 8 as an aggregation level (for example, see NPL 2). Then, the levels 1, 2, 4 and 8 respectively have search spaces which are configured from 6, 6, 2 and 2 types of mapping candidate positions. Here, the mapping candidate positions are candidates of regions to which control signals are mapped. If one aggregation level is configured for one terminal, a control signal is actually mapped to one of the mapping candidate positions of a plurality of control signals that the aggregation level has.

FIG. 19 is a diagram showing an example of a search space corresponding to the R-PDCCH. Each ellipse shown in FIG. 19 shows the mapping candidate position of the control signal of each aggregation level. A plurality of mapping candidate positions in each search space of each aggregation level are continuously placed in Virtual Resource Blocks (VRB). Then, each mapping candidate position in the VRBs is mapped to Physical Resource Blocks (PRB) by signaling of the RRC layer.

It is considered that the search space corresponding to the ePDCCH is individually configured for each terminal. With regard to the design of the ePDCCH, it is possible to use a portion of the design of the R-PDCCH, or to use a design totally different from the design of the R-PDCCH. Actually, it is considered that the designs of the ePDCCH and the R-PDCCH are different.

As described above, in the R-PDCCH, a DL grant is mapped to a first slot and a UL grant is mapped to a second slot. In other words, the resource to which the DL grant is mapped and the resource to which the UL grant is mapped are divided in the time axis. In contrast, it is considered that in the ePDCCH, the resource to which the DL grant is mapped and the resource to which the UL grant is mapped are divided in the frequency axis (that is, subcarriers or RB pairs) or an RE in a PRB pair is divided into a plurality of groups.

Further, as a placing method of the ePDCCH, both of "Localized allocation" which collectively places the ePDCCHs in close positions on the frequency band and "Distributed allocation" which distributes and places the ePDCCHs on the frequency band are considered. "Localized Allocation" is an allocation method which obtains a frequency scheduling gain and can allocate the ePDCCH in a resource having good channel quality, based on channel quality information. "Distributed Allocation" is able to distribute the ePDCCHs on the frequency axis so as to obtain a frequency diversity gain. Further, it is considered that the base station simultaneously configures "Localized search space" and "Distributed search space".

CITATION LIST

Non Patent Literature

[NPL 1] 3GPP TS36.216 v10.1.0, "Physical layer for relaying operation"
[NPL 2] 3GPP TS36.211 v10.4.0, "Evolved Universal Terrestrial Radio Access (E-UTRA) Physical Channels and Modulation"
[NPL 3] 3GPP TS36.304 v10.4.0, "Evolved Universal Terrestrial Radio Access (E-UTRA) User Equipment (UE) procedures in idle mode"
[NPL 4] 3GPP RAN WG1, R1-113675, "Further details on design principles for additional carrier types". Ericsson, ST-Ericsson
[NPL 5] 3GPP RAN WG1, R1-114071, "Issues Regarding Additional Carrier Type in Rel-11 CA", NTT DOCOMO

SUMMARY OF INVENTION

Technical Problem

In the LTE system, a terminal in an idle state detects a cell ID by receiving a synchronization channel of an adjacent cell in order to reselect a cell to be connected, and measures a CRS which is a reference signal in order to measure reception power from a cell corresponding to the detected cell ID. The terminal in the idle state that has measured the CRS determines the cell to be reselected (see NPL 3). As described above, in the CRS, since the position of the resource is determined by the cell ID, the terminal in the idle state can determine the resource in which the CRS is placed, at a time in which the cell ID is detected.

Further, In the LTE system, the terminal in the connected state searches for a cell of a handover destination (target cell) based on the measurement configuration included in the specific control information transmitted from the base station.

The terminal in the connected state detects a cell ID by receiving a synchronization channel of the adjacent cell, and measures the CRS which is a reference signal in order to measure the reception power from the cell corresponding to the detected cell ID. If the terminal in the connected state reports the measurement result to the base station, the base station determines the cell of the handover destination.

In the LTE-Advanced system, a cell that operates only in the ePDCCH without the PDCCH region has been studied. This cell is referred to as "an extension carrier type cell", "a cell of an additional carrier type, new type carrier type cell", or the like (see NPLs 4 and 5). Hereinafter, the cell is referred to as "a cell of an additional carrier type". It is considered that the cell of the additional carrier type does not transmit the CRS which is a reference signal so as to avoid interference with other cells. Therefore, in the LTE-Advanced system of a scheme using cells operating only in the ePDCCH, when a terminal in an idle state performs reselection of a cell or when the terminal in the connected state performs movement control, how to transmit a reference signal for measuring reception power of a cell to the terminal is a problem.

An object of the present invention is to provide a wireless communication device which transmits a reference signal in order for a wireless communication terminal to measure reception power from a communication cell, a wireless communication terminal using the reference signal, a reference signal transmission control method and a reference signal processing method.

Solution to Problem

According to one aspect of the invention, there is provided a wireless communication device transmitting a reference signal with which a wireless communication terminal measures reception power from a communication cell, in a resource of a data region, comprising:

a control section configured to determine the resource of the data region in which a reference signal specific to the wireless communication terminal is placed; and a wireless transmission section configured to transmit the reference signal in the resource determined by the control section.

According to another aspect of the invention, there is provided a wireless communication terminal which receives a reference signal for measuring reception power of a signal transmitted from a communication cell of a wireless communication device, comprising:

a cell ID detection section configured to detect a cell ID, based on a synchronization signal from the wireless communication device;

a cell type determination section configured to determine whether or not a cell type of a cell ID detected by the cell ID detection section is a cell of a type of transmitting the reference signal in a resource of a data region;

a specific reference signal management section configured to specify the resource of the data region in which the reference signal is placed, in a case where the cell type is determined to be the cell of the type of transmitting the reference signal in the resource of the data region, by the cell type determination section; and a reception power measurement section configured to measure reception power of the reference signal transmitted in the resource specified by the specific reference signal management section.

According to another aspect of the invention, there is provided a reference signal transmission control method by a wireless communication device which transmits a reference signal with which a wireless communication terminal measures reception power from a communication cell, in a resource of a data region, comprising:

determining the resource of the data region in which a reference signal specific to the wireless communication terminal is placed; and transmitting the reference signal in the determined resource.

According to still another aspect of the invention, there is provided a reference signal processing method by a wireless communication terminal which receives a reference signal for measuring reception power of a signal transmitted from a communication cell of a wireless communication device, comprising:

detecting a cell ID, based on a synchronization signal from the wireless communication device;

determining whether or not a cell type of a detected cell ID is a cell of a type of transmitting the reference signal in a resource of a data region;

specifying the resource of the data region in which the reference signal is placed, in a case where the cell type is determined to be the cell of the type of transmitting the reference signal in the resource of the data region; and measuring reception power of the reference signal transmitted in a specified resource.

Advantageous Effects of Invention

According to the wireless communication device and the reference signal transmission control method according to the present invention, it is possible for the wireless communication device to transmit a reference signal with which a wireless communication terminal measures reception power from a communication cell. Further, according to the wireless communication terminal and the reference signal processing method according to the present invention, it is possible to measure the reception power from the communication cell using the reference signal.

DESCRIPTION OF EMBODIMENTS

Figure 1:
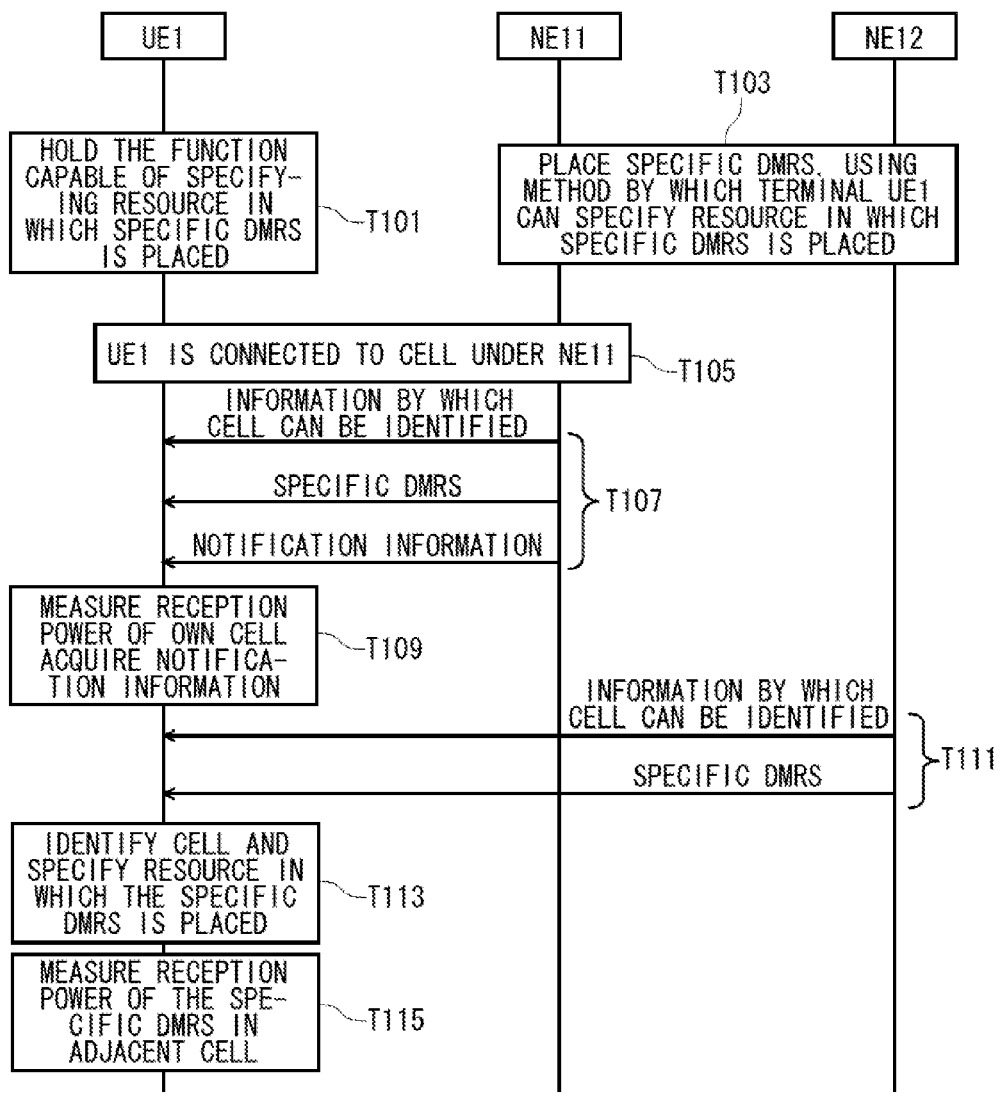
FIG. 1 is a drawing showing an example of a timing chart when a terminal UE1 measures an adjacent cell for movement control in a wireless communication system of a first embodiment.

Hereinafter, embodiments of the present invention will be described with reference to drawings.

The embodiments of a wireless communication system according to the present invention will be described in detail with reference to drawings. The wireless communication system described below includes at least one wireless communication terminal and a plurality of wireless communication devices capable of communicating with the wireless communication terminal through a wireless communication network. In the following description, the wireless communication terminal is simply referred to as a "terminal". The terminal is, for example, a mobile phone. Further, in the following description, the wireless communication device is a device capable of wirelessly communicating with the terminal, collectively referring to, for example, a wireless communication base station (E-UTRAN NodeB: eNB), a remote base station (Remote Radio Head: RRH) installed at a location away from the wireless communication base station, a relay device (relay node or repeater) that is wirelessly connected with the wireless communication base station, a femto base station and a pico base station. In addition, the remote base station (RRH) has the same function as a radio section (Radio Frequency section: RF section) of the wireless communication base station (eNB), and is connected to a wireless communication base station (eNB) by a wire cable such as an optical fiber cable, or the like.

The wireless communication system uses a LTE or a LTE-Advanced mobile communication technology that has been standardized by the 3rd Generation Partnership Project (3GPP). However, the mobile communication technology used by the wireless communication system is not limited to the above standard, and may be a Wireless Local Area Network (wireless LAN), Worldwide Interoperability for Microwave Access (WiMAX) such as IEEE802.16, IEEE802.16e, or IEEE802.16m, 3GPP2 System Architecture Evolution (SAE), a Universal Mobile Telecommunications System (UMTS), or the fourth generation mobile communication standard.

Each wireless communication device constitutes at least one communication cell. The communication cell refers to a wireless network object that the terminal can uniquely identify, based on the difference of the identifier assigned to a geographic area or the frequency used in the geographic area.

In the following description, the communication cell is simply referred to as a "cell". By one wireless communication device or one reception point, one or more cells are formed for each of one or more carrier frequencies. In addition, the above configuration is a basic concept, and the wireless communication device may constitute one cell in cooperation with other wireless communication devices. The terminal performs communication using at least one cell constituted by the wireless communication device.

Hereinafter, the wireless communication systems of the first to eighth embodiments will be described in order. In addition, in the first to eighth embodiments, the same reference numerals are given to components having the same functions, and overlapping descriptions will be omitted. Further, in the wireless communication system of the respective following embodiments, "the cell of the additional carrier type" will be described as the form of a cell. "The cell of the additional carrier type" is a cell in which an ePDCCH region is placed instead of a PDCCH region and a CRS which is a reference signal is not transmitted. In addition, the content of each embodiment described later may be applied to a cell other than "the cell of the additional carrier type", for example a cell transmitting, for example, a PDCCH and a CRS. That is, it is desirable that the terminal can determine whether to apply the operation of the present embodiment.

First Embodiment

A wireless communication system of a first embodiment will be described with reference to FIGS. 1 to 4. The wireless communication system of the first embodiment includes the terminal and the wireless communication device which are described above. The terminal performs a measurement for movement control, using a specific DMRS (UE specific Reference Signal) which is a reference signal specific to the terminal. The wireless communication device transmits a DMRS used in measurement for movement control by the terminal (specific DMRS), with performing precoding for all terminals on the specific DMRS or without performing the precoding on the specific DMRS. Further, the wireless communication device performs an allocation and a management of a radio resource (for example, a frequency band in a frequency domain or a time domain) for each terminal and has a role as an access point of a wireless access network for the terminal.

FIG. 1 is a drawing showing an example of a timing chart when a terminal UE1 measures an adjacent cell for movement control in a wireless communication system of a first embodiment. As shown in FIG. 1, a function capable of specifying a resource, in which a specific DMRS notified by the cell is placed, is configured in advance in the terminal UE1 (T101). In addition, the specific DMRS is a DMRS subjected to precoding for all terminals or a DMRS not subjected to precoding. On the other hand, the wireless communication device NE11 and the wireless communication device NE12, shown in FIG. 1, place a specific DMRS such that the terminal UE1 can specify the resource in which the specific DMRS is placed (T103). For example, the wireless communication device NE11 and the wireless communication device NE12 share a table or a calculation expression, by which a resource in which the specific DMRS is placed is derived from a cell ID, with the wireless communication terminal UE1 in advance, and specify the resource of the specific DMRS from the cell ID of its own cell. Therefore, it is possible to prevent the specific DMRS from being subjected to interference between cells.

Further, as another method, there is a method of placing a specific DMRS, using the same resource in all cells regardless of cell IDs. According to this method, a table or a calculation expression is not needed to be set in the terminal in advance. Therefore, it is easy to design the terminal. As still another method, there is a method of informing the resource of the specific DMRS by notification information. Thus, since the placement of the resource of the specific DMRS can be changed according to the cell placement, it is possible to design a network flexibly. In addition, a method other than the methods described above may be used.

In the example shown in FIG. 1, the terminal UE1 is connected to a cell under the wireless communication device NE11 (T105). The cell under the wireless communication device NE11 notifies information by which a cell can be identified (for example, a synchronization signal), a specific DMRS, and notification information (T107). The terminal UE1 measures the reception power of the cell (own cell) under the wireless communication device NE11, and acquires notification information (T109).

The cell under wireless communication device NE12 notifies information, by which a cell can be identified (for example, a synchronization signal), and a specific DMRS (T111). In a case where the terminal UE1 is in an idle state, if the terminal UE1 determines to perform a cell reselection of an adjacent cell, based on the control information included in the notification information, the terminal UE1 acquires the synchronization signal of a cell under the wireless communication device NE12. Then, after identifying the cell from the acquired synchronization signal, the terminal UE1 specifies the resource in which the specific DMRS is placed (T113). Then, the terminal UE1 measures the reception power of the specific DMRS in the cell (adjacent cell) under the wireless communication device NE12 (T115).

In a case where the terminal UE1 is in a connected state, the terminal UE1 acquires a measurement configuration that is included in the specific control information, from its own cell. If the terminal UE1 determines that it is necessary to measure the adjacent cell, based on the measurement configuration, the terminal UE1 acquires the synchronization signal of the cell under the wireless communication device NE12. Then, after identifying the cell from the acquired synchronization signal, the terminal UE1 specifies the resource in which the specific DMRS is placed. Then, the terminal UE1 measures the reception power of the specific DMRS in the cell (adjacent cell) under the wireless communication device NE12.

In this manner, since the terminal UE1 can measure the reception power of its own cell and the adjacent cell by measuring the specific DMRS even in the idle state or the connected state, the terminal UE1 is able to perform movement control. In addition, after the resource of CSI-RS is informed from its own cell, the terminal UE1 in the connected state may perform measurement of its own cell by the CSI-RS and perform measurement of the adjacent cell, using the specific DMRS. Further, the terminal UE1 may perform measurement, using any one of the CRS, the CSI-RS and the specific DMRS depending on the type of the cell. For example, in a case where a cell notifying the CRS and a cell notifying the specific DMRS exist together on the same frequency, the terminal UE1 performs measurement of the cell notifying the CRS by the CRS, and performs measurement of the cell notifying the specific DMRS, using the specific DMRS. Further, in a case where information of the CSI-RS is included in the measurement configuration of the adjacent cell, the terminal UE1 may perform measurement of the adjacent cell, using the CSI-RS, and perform measurement of other cells, using the specific DMRS.

Configuration of Terminal UE1 of First Embodiment

Figure 2:
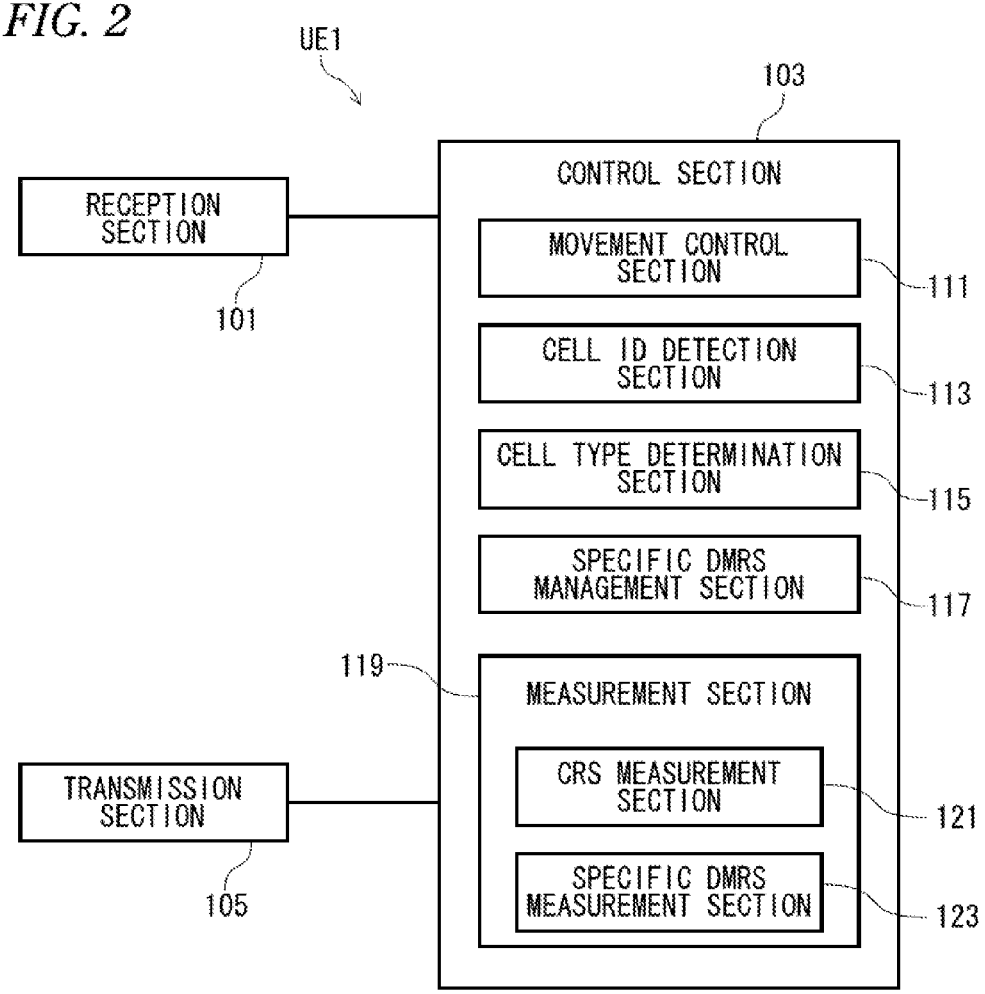
FIG. 2 is a block diagram of the terminal UE1 constituting the wireless communication system of the first embodiment.

FIG. 2 is a block diagram of a terminal UE1 constituting a wireless communication system of a first embodiment. As shown in FIG. 2, the terminal UE1 of the first embodiment includes a reception section 101, a control section 103, and a transmission section 105. The control section 103 includes a movement control section 111, a cell ID detection section 113, a cell type determination section 115, a specific DMRS management section 117, and a measurement section 119. The measurement section 119 includes a CRS measurement section 121, and a specific DMRS measurement section 123.

The reception section 101 receives notification information or control information such as specific control information through the downlink of the cell to which the terminal UE1 is connected, in response to the instruction from the control section 103. Further, the reception section 101 outputs the received control information to the control section 103. Further, the reception section 101 measures the CRS in response to the instruction from the CRS measurement section 121 of the measurement section 119 included in the control section 103. The reception section 101 transmits the measurement result of the CRS to the CRS measurement section 121. Further, the reception section 101 measures DMRS in response to the instruction from the specific DMRS measurement section 123 of the measurement section 119 included in the control section 103. The reception section 101 transmits the measurement result of the DMRS to the specific DMRS measurement section 123. The reception section 101 receives a synchronization signal in response to the instruction from the cell ID detection section 113 of the control section 103. The reception section 101 transmits the received synchronization signal to the cell ID detection section 113.

The control section 103 instructs the reception section 101 to receive the notification information or the control information such as specific control information. The control information received by the reception section 101 is input to the control section 103. Information regarding the measurement of the reception power of a cell, included in the control information which is input to the control section 103, is input to the movement control section 111 of the control section 103. If the movement control section 111 instructs the measurement of the adjacent cell, the control section 103 starts the measurement of the adjacent cell.

Hereinafter, each of the components included in the control section 103 will be described.

The movement control section 111 determines whether to perform a reselection of the adjacent cell, based on control information regarding the cell reselection which is input from the control section 103 and the reception power or the reception quality of its own cell and the adjacent cell when the terminal UE1 is in the idle state. On the other hand, the movement control section 111 prepares a measurement report based on a measurement configuration which is input from the control section 103 and the reception power or the reception quality of its own cell and the adjacent cell when the terminal UE1 is in the connected state. The measurement report prepared by the movement control section 111 is transmitted to the transmission section 105.

In a case where the cell type of its own cell is the cell (cell of the related art) notifying a PDCCH, the movement control section 111 instructs the CRS measurement section 121 of the measurement section 119 to measure the reception power or the reception quality of its own cell. On the other hand, in a case where the cell type of its own cell is "the cell of the additional carrier type", the movement control section 111 instructs the specific DMRS measurement section 123 of the measurement section 119 to measure the reception power or the reception quality of its own cell.

If it is determined that it is desirable to reselect the adjacent cell when the terminal UE1 is in the idle state, the movement control section 111 outputs the determination result to the control section 103. On the other hand, if it is determined to report a measurement report based on the measurement configuration when the terminal UE1 is in the connected state, the movement control section 111 prepares the measurement report and outputs the measurement report to the transmission section 105. Further, if it is determined to start the measurement of the adjacent cell based on the reception power or the reception quality of its own cell which is input from the measurement section 119 when the terminal UE1 is in the connected state, the movement control section 111 instructs the cell ID detection section 113 to detect the cell.

The cell ID detection section 113 instructs the reception section to receive the synchronization signal. The cell ID detection section 113 detects the cell ID of the adjacent cell, based on the synchronization signal which is input from the reception section. The cell ID detection section 113 outputs the detected cell ID to the cell type determination section 115. In addition, the cell ID detection section 113 acquires information necessary for detecting the cell ID of the adjacent cell (for example, a detection signal corresponding to the cell ID) from the control section 103. The cell ID detection section 113 may instruct the reception section to detect the detection signal and may detect the adjacent cell based on the detection signal received by the reception section. In this case, the control section 103 may have a method to know a detection signal corresponding to the cell ID, from the notification information or the specific control information.

The cell type determination section 115 determines whether the cell type of the cell ID detected by the cell ID detection section 113 is "the cell of the additional carrier type" or the cell of the related art notifying a PDCCH. If it is determined that the cell type of the cell ID is "the cell of the additional carrier type", the cell type determination section 115 outputs the cell ID to the specific DMRS management section 117. On the other hand, if it is determined that the cell type of the cell ID is the cell of the related art, the cell type determination section 115 outputs the cell ID to the CRS measurement section 121 of the measurement section 119.

Hereinafter, a cell type determination method performed by the cell type determination section 115 will be described. The cell type determination section 115 determines a cell type by performing any one of determination method examples described below.

First Determination Method Example

The cell type determination section 115 determines whether the cell type is "the cell of the additional carrier type" or the cell of the related art from frequencies. By doing so, the terminal is able to perform a cell search after specifying that the cell type is "the cell of the additional carrier type", and thus it is possible to reduce power consumption of the terminal.

Second Determination Method Example

In the method, the synchronization signal of the cell of the additional carrier type is different from the synchronization signal of the cell of the related art. That is, the cell of the additional carrier type uses the sequence obtained by inverting the sequence of Primary Synchronization Signals (PSS) in the subframe number 0 and the subframe number 5. Accordingly, in a case of the cell of the additional carrier type, if the PSS of the subframe number 0 and the PSS of the subframe number 5 are added to each other, the size becomes zero, whereas if they are subtracted from each other, the size becomes double. On the other hand, in a case of the cell of the related art, if the PSS of the subframe number 0 and the PSS of the subframe number 5 are added to each other, the size becomes double, whereas if they are subtracted from each other, the size becomes zero. The cell type determination section 115 determines whether the cell type is "the cell of the additional carrier type" or the cell of the related art, based on each calculation result obtained by the addition and the subtraction of the PSS of the subframe number 0 and the PSS of the subframe number 5.

Third Determination Method Example

In the method, the synchronization signal of the cell of the additional carrier type is placed at a resource located in a position different from that of the synchronization signal of the cell of the related art. The cell type determination section 115 attempts to detect the synchronization signals of both the cell of the additional carrier type and the cell of the related art. In a case where the synchronization signal is detected, the cell type determination section 115 determines whether the cell type is the cell of the additional carrier type or the cell of the related art, depending on the position of the detected synchronization signal.

Fourth Determination Method Example

The cell type determination section 115 determines whether the cell type is the cell of the additional carrier type or the cell of the related art, depending on the Cyclic Redundancy Check (CRC) of the Master Information Block (MIB). The cell of the additional carrier type is configured such that the resource used in notification of the MIB has a different RE level. In a case of using the CRC in the cell of the related art, since the MIB of the cell of the additional carrier type becomes an error, the cell type determination section 115 can determine the type of cell.

Fifth Determination Method Example

In the method, information indicating whether or not the cell type is the cell of the additional carrier type is included in the notification information. The cell type determination section 115 determines whether or not the cell type is the cell of the additional carrier type, based on the information included in the notification information. In addition, the information included in the notification information may be a flag indicating that the cell type is the cell of the additional carrier type.

Sixth Determination Method Example

In the method, information indicating whether or not the adjacent cell is the cell of the additional carrier type is included in the notification information. In addition, the information may be a flag indicating whether or not all adjacent cells are the cells of the additional carrier type. Further, the information may be an adjacent cell list indicating whether or not the cell type is the cell of the additional carrier type for each adjacent cell identifier. Further, the cell type determination section 115 may determine which one a network will notify, depending on the situation. In this case, a method in which the network performs notification at Choice may be used. The cell type determination section 115 compares a cell ID detected by the cell ID detection section 113 from the synchronization signal with the adjacent cell list, and determines whether or not the cell type is the cell of the additional carrier type.

In addition, the cell type determination section 115 may determine a cell type by a method other than the methods described above.

If a cell ID is input, the CRS measurement section 121 of the measurement section 119 informs the reception section 101 of the resource of the CRS corresponding to the cell ID which is set in advance, and instructs the reception section 101 to measure the CRS. The CRS measurement section 121 calculates the reception power or the reception quality based on the measurement result of the CRS which is input from the reception section 101, and outputs the calculation result to the movement control section 111.

If the cell ID is input, the specific DMRS management section 117 specifies the resource in which a specific DMRS that can be used for the movement control is placed. In addition, the specific DMRS is a DMRS subjected to precoding for all terminals or a DMRS not subjected to precoding. The specific DMRS management section 117 outputs the resource in which the specific DMRS is placed and the cell ID to the specific DMRS measurement section 123 of the measurement section 119.

Hereinafter, a method in which the specific DMRS management section 117 specifies the resource in which the specific DMRS is placed will be described. The specific DMRS management section 117 specifies the resource of a specific DMRS by performing any one of the specification method examples described below.

First Specification Method Example

The specific DMRS management section 117 holds a table or a calculation expression for deriving from a cell ID, a resource in which the specific DMRS is placed. The specific DMRS management section 117 specifies the resource of the specific DMRS corresponding to a cell ID which is input, based on the table or the calculation expression. By doing so, if the cell ID is detected, it is possible to identify the specific DMRS. That is, it is possible to change the placement of the specific DMRS between cells, thereby performing interference control.

Second Specification Method Example

In the example, the same resource is used between cells as the resource of the specific DMRS. In this case, the specific DMRS management section 117 specifies the resource of the specific DMRS common to cells which is held in advance. By doing so, the terminal UE1 may not hold the table and the calculation expression.

Third Specification Method Example

In the example, the resource of the specific DMRS of its own cell and the resource of the specific DMRS of the adjacent cell are included in the notification information of its own cell. In this case, the specific DMRS management section 117 specifies the resource of specific DMRS corresponding to the cell ID which is input, by receiving the notification information of its own cell.

Fourth Specification Method Example

When the terminal UE1 is in a state connected with its own cell, the terminal UE1 is notified of information regarding the resource in which the specific DMRS is placed in the adjacent cell by the specific control information transmitted from its own cell. In this case, the specific DMRS management section 117 specifies the resource of the specific DMRS corresponding to the cell ID which is input, by receiving the specific control information of its own cell.

Fifth Specification Method Example

The specific DMRS management section 117 holds a table or a calculation expression from which the resource of the specific DMRS is derived. The specific DMRS management section 117 derives a list of resources in which the specific DMRS may exist, by the table or the calculation expression. The specific DMRS management section 117 specifies the resource of the specific DMRS by blind decoding the list of resources in which the specific DMRS may exist. By doing so, it is possible to place a specific DMRS having some degree of freedom.

In addition, the specific DMRS management section 117 may specify the resource of the specific DMRS, using a method other than the methods described above.

If the cell ID and the resource of the specific DMRS are input, the specific DMRS measurement section 123 of the measurement section 119 informs the reception section 101 of the cell ID and the resource of the specific DMRS, and instructs the reception section 101 to measure the DMRS. The specific DMRS measurement section 123 calculates the reception power or the reception quality based on the measurement result of the DMRS which is input from the reception section 101, and outputs the calculation result to the movement control section 111.

The transmission section 105 transmits a random access preamble, a control signal response, data, or the like. Further, the transmission section 105 transmits a UL packet addressed to the wireless communication device NE11 or NE12, at the transmission timing corresponding to the wireless communication device.

Configuration of a Wireless Communication Device NE11 of the First Embodiment

Figure 3:
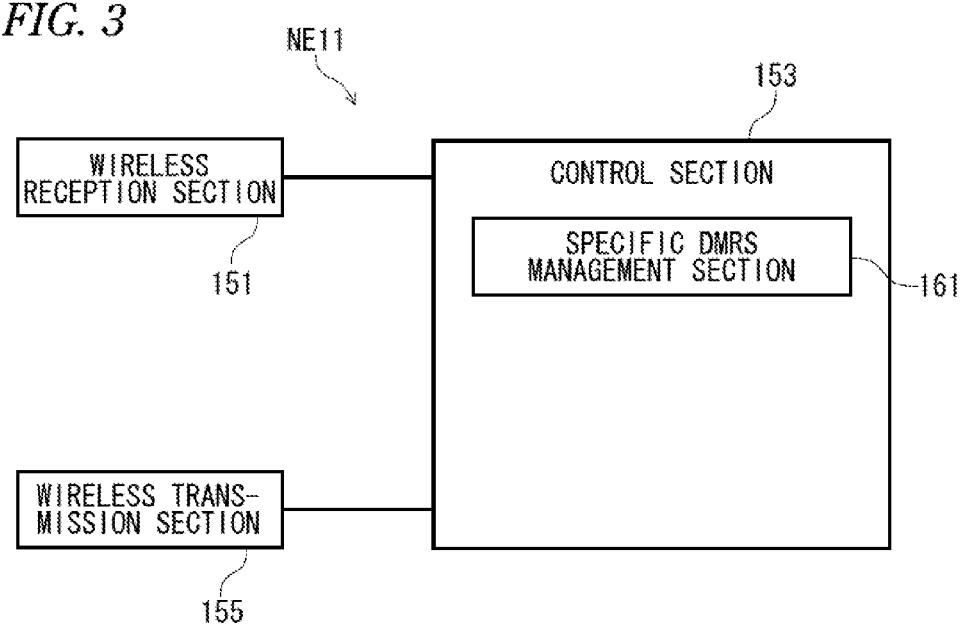
FIG. 3 is a block diagram of a wireless communication device NE11 constituting the wireless communication system of the first embodiment.

FIG. 3 is a block diagram of a wireless communication device NE11 constituting the wireless communication system of the first embodiment. As shown in FIG. 3, the wireless communication device NE11 of the first embodiment includes a wireless reception section 151, a control section 153, and a wireless transmission section 155. The control section 153 includes a specific DMRS management section 161.

The wireless reception section 151 receives a random access preamble, a control signal response, or the like which is transmitted from the terminal UE1 so as to output to the control section 153. Further, the wireless reception section 151 receives a UL packet transmitted from the terminal UE1 so as to output to the control section 153.

In a case where a cell provided by the wireless communication device NE11 is used as "the cell of the additional carrier type", the control section 153 determines the resource of the specific DMRS, using a method capable of detecting the terminal UE1, and outputs information regarding the determined resource to the specific DMRS management section 161. Further, the control section 153 transmits an instruction to perform precoding for all terminals on the specific DMRS or an instruction not to perform precoding on the specific DMRS, to the specific DMRS management section 161. The control section 153 generates the notification information so as to output to the wireless transmission section 155. In a case of using the specific DMRS, the control section 153 outputs a packet corresponding to the specific DMRS to the wireless transmission section 155, with performing precoding for all terminals on the packet corresponding to the specific DMRS or without performing the precoding on the packet corresponding to the specific DMRS. The control section 153 generates a random access response corresponding to a random access preamble so as to output to the wireless transmission section 155. The control section 153 generates specific control information for each terminal so as to output to the wireless transmission section 155.

The specific DMRS management section 161 outputs the specific DMRS to the wireless transmission section 155, with performing precoding for all terminals on the specific DMRS or without performing the specific DMRS, in response to the instruction from the control section 153.

The wireless transmission section 155 transmits the specific DMRS which is input from the specific DMRS management section 161, to the terminal UE1. The wireless transmission section 155 transmits data which is input from the control section 153, notification information, specific control information, a random access response, or the like to the terminal UE1.

Cell Reselection Method of the Terminal UE1 in the
First Embodiment

Figure 4:
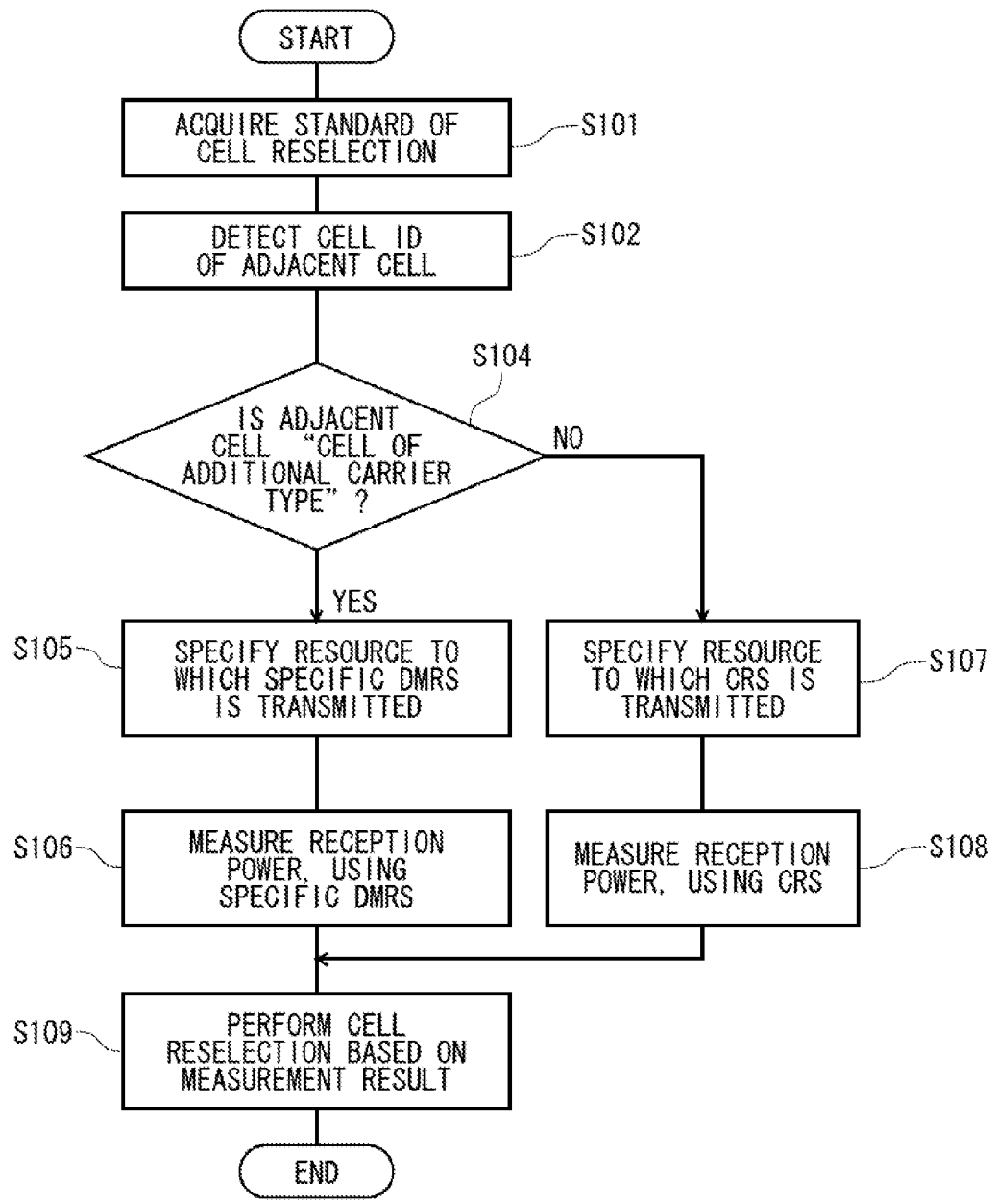
FIG. 4 is a flowchart when the terminal UE1 in an idle state performs a cell reselection in the wireless communication system of the first embodiment.

Hereinafter, with reference to FIG. 4, an operation when the terminal UE1 in the idle state performs a cell reselection will be described. FIG. 4 is a flowchart when the terminal UE1 in the idle state performs a cell reselection in the wireless communication system of the first embodiment. In addition, the terminal UE1 is connected to the cell (own cell) provided by the wireless communication device NE11 and is in the idle state.

As shown in FIG. 4, the terminal UE1 acquires a standard or the like of a cell reselection using the notification information from its own cell (step S101). Next, the terminal UE1 detects a cell ID of an adjacent cell (step S102). Next, the terminal UE1 determines whether or not the adjacent cell is "the cell of the additional carrier type" (step S104). At this time, for example, the terminal UE1 attempts both a cell ID detection method for the additional carrier type and a cell ID detection method of the related art by the blind decoding, in step S102. The terminal UE1 determines whether or not the cell type is the cell of the additional carrier type, depending on a method by which the cell ID is detected. Further, after the cell type is determined to be the cell of the additional carrier type, the terminal UE1 may attempt to detect the cell ID of the cell.

In step S104, in a case where the cell type is determined to be the cell of the additional carrier type (that is, in a case of Yes), the process proceeds to step S105, but in a case where the cell type is not determined to be the cell of the additional carrier type (that is, in a case of No), the process proceeds to step S107. In step S105, the terminal UE1 specifies the resource to which the specific DMRS, on which the preceding for all terminals is performed or the precoding is not performed, is transmitted. Next, the terminal UE1 measures the reception power, using the specific DMRS (step S106). On the other hand, in step S107, the terminal UE1 specifies the resource to which the CRS is transmitted, from the cell ID. Next, the terminal UE1 measures the reception power, using the CRS transmitted in the resource of the specified cell ID (step S108).

If the measurement of the reception power in step S106 or S108 is successful, the terminal UE1 proceeds to step S109. In step S109, the terminal UE1 performs a cell reselection, based on the measurement result of the reception power.

In addition, by using the same method as the methods described above, the terminal UE1 in the connected state may perform the movement control. That is, in step S109, the terminal UE1 prepares a measurement result report based on the measurement result of the reception power.

As described above, according to the present embodiment, since the terminal UE1 can acquire the reception power by measuring the specific DMRS, the movement control is possible without using the CRS which is used as the reference signal in the LTE system. Further, if the specific DMRS is used, the terminal UE1 in the idle state can perform the cell reselection in the same order as in the cell reselection of the related art. Thus, the processing load of the terminal UE1 can be reduced and a new reference signal may not be added. Further, the resource placement in the cell becomes easy.

Second Embodiment

With reference to FIGS. 5 to 9, a wireless communication system of the second embodiment will be described. The wireless communication system of the second embodiment is different from the wireless communication system of the first embodiment in that a terminal limits the DMRS measured for movement control (specific DMRS) on which the precoding for all terminals is performed or the precoding is not performed, to the DMRS on a RB to which the ePDCCH is transmitted. The second embodiment is the same as the first embodiment except for the above point.

Figure 5:
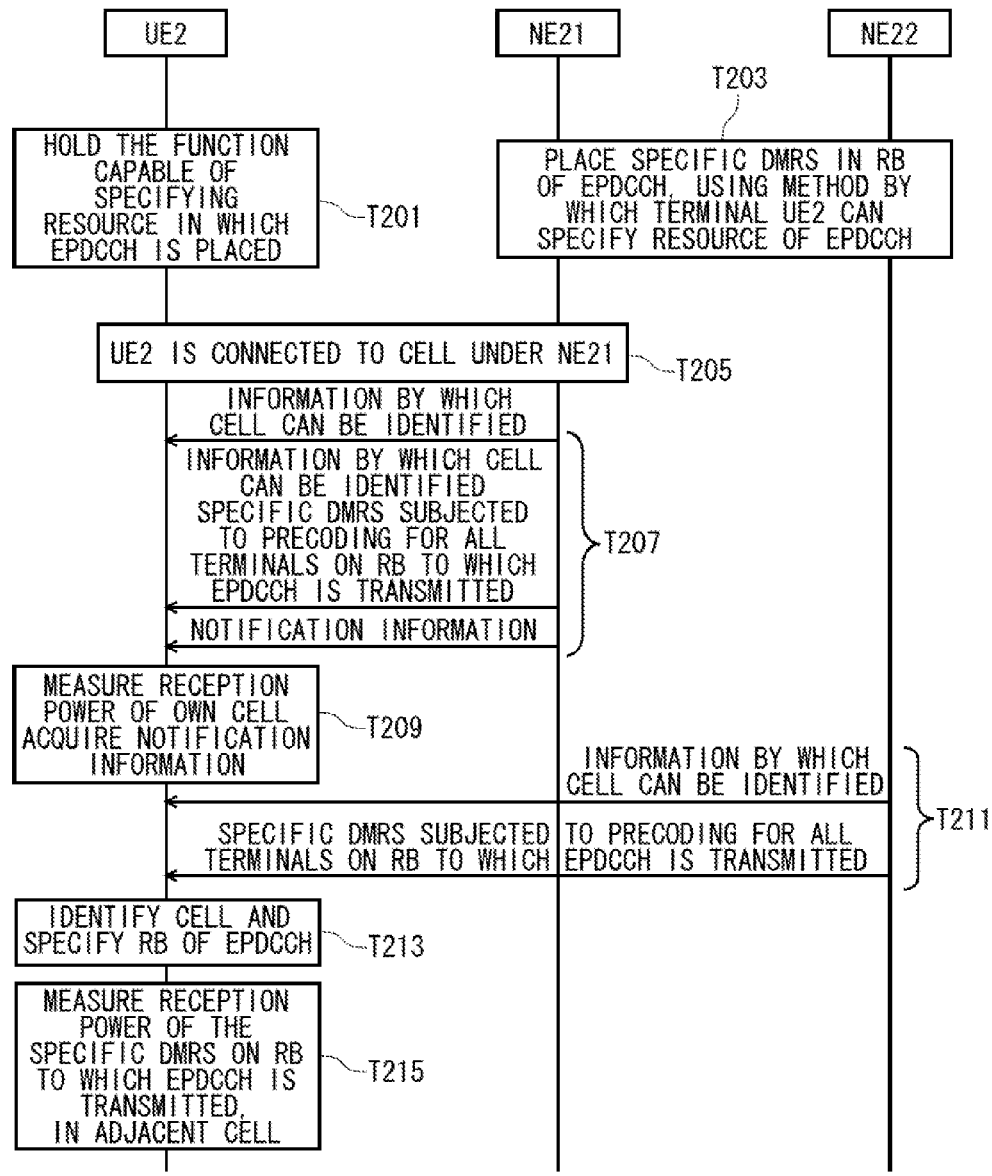
FIG. 5 is a diagram showing an example of a timing chart when a terminal UE2 measures an adjacent cell for movement control in a wireless communication system of a second embodiment.

FIG. 5 is a diagram showing an example of a timing chart when a terminal UE2 measures an adjacent cell for movement control in a wireless communication system of a second embodiment. As shown in FIG. 5, a function capable of identifying a resource, in which the ePDCCH transmitted by the cell is placed, is configured in advance in the terminal UE2 (T201). On the other hand, the wireless communication device NE21 and the wireless communication device NE22, which are shown in FIG. 5, place a specific DMRS in the RB of an ePDCCH such that the terminal UE2 can specify the resource of the ePDCCH (T203). For example, the wireless communication device NE21 and the wireless communication device NE22 share a table or a calculation expression with the wireless communication terminal UE2 in advance, from which a resource in which the ePDCCH is placed is derived from a cell ID so as to specify the resource of the ePDCCH from the cell ID of its own cell. Therefore, it is possible to prevent the ePDCCH from being subjected to interference between cells.

Further, as another method, there is a method of placing the ePDCCH, using the same resource in all cells regardless of cell IDs. According to this method, a table or a calculation expression is not needed to be set in the terminal in advance. Therefore, it is easy to design the terminal. As still another method, there is a method of notifying the resource of the ePDCCH by notification information. Thus, it is possible to change the placement of the resource of the ePDCCH according to the cell placement, thereby flexibly designing a network. In addition, a method other than the methods described above may be used.

In an example shown in FIG. 5, the terminal UE2 is connected to a cell under the wireless communication device NE21 (T205). The cell under the wireless communication device NE21 notifies information by which a cell can be identified (for example, a synchronization signal), a specific DMRS, transmitted on a RB for transmitting the ePDCCH, on which the precoding for all terminals is performed or is not performed, and notification information (T207). The terminal UE2 measures the reception power of the cell (own cell) under the wireless communication device NE21, and acquires notification information (T209).

The cell under wireless communication device NE22 notifies information by which a cell can be identified (for example, a synchronization signal) and the specific DMRS, on a RB for transmitting the ePDCCH, on which the precoding for all terminals is performed or is not performed (T211). In a case where the terminal UE2 is in an idle state, if the terminal UE2 determines that a cell reselection of an adjacent cell is performed, based on the control information included in the notification information, the terminal UE2 acquires the synchronization signal of the cell under the wireless communication device NE22. Then, after identifying the cell from the acquired synchronization signal, the terminal UE2 specifies the RB of the ePDCCH (T213). Then, the terminal UE2 measures the reception power of the specific DMRS on the RB to which the ePDCCH is transmitted, in the cell (adjacent cell) under the wireless communication device NE12 (T215).

In a case where the terminal UE2 is in the connected state, the terminal UE2 acquires a measurement configuration that is included in the specific control information from its own cell. If it is determined to be necessary to measure the adjacent cell based on the measurement configuration, the terminal UE2 acquires the synchronization signal of a cell under the wireless communication device NE22. Then, after identifying the cell from the acquired synchronization signal, the terminal UE2 specifies the RB in which the ePDCCH is placed. Then, the terminal UE2 measures the reception power of the specific DMRS on the RB to which the ePDCCH is transmitted, in the cell (adjacent cell) under the wireless communication device NE22.

In this manner, since the terminal UE2 can measure the reception power of its own cell and the adjacent cell by measuring the specific DMRS, on a RB to which the ePDCCH is transmitted, on which the precoding for all terminals is performed or is not performed even in an idle state or a connected state, it is possible to perform the movement control. Further, the DMRS on the RB to which the ePDCCH is transmitted is used as the specific DMRS, and thus the terminal UE2 can use the specific DMRS in decoding the common search space of the ePDCCH. Therefore, it is possible to reduce the effects of transmission efficiency decrease caused by transmitting a specific DMRS.

In addition, the wireless communication device NE21 and the wireless communication device NE22 may limit the RB for transmitting the specific DMRS, to a part of RBs to which the ePDCCH is transmitted. By doing so, it is possible to place the ePDCCH in a resource different from the resource obtained by the above-mentioned method. Further, it is possible to reduce the ePDCCHs on which the precoding for all terminals is performed or not performed, thereby efficiently using the resource of the ePDCCH.

In addition, among RBs for transmitting the ePDCCH, the RB for transmitting the specific DMRS may be limited to the RB of the ePDCCH to which a common search space may be transmitted. In this manner, since it is possible to use the specific DMRS in decoding of the common search space of the ePDCCH, the possibility of using the specific DMRS for the movement control use and the decoding use is increased, and efficient use of radio resource is possible.

Figure 6:
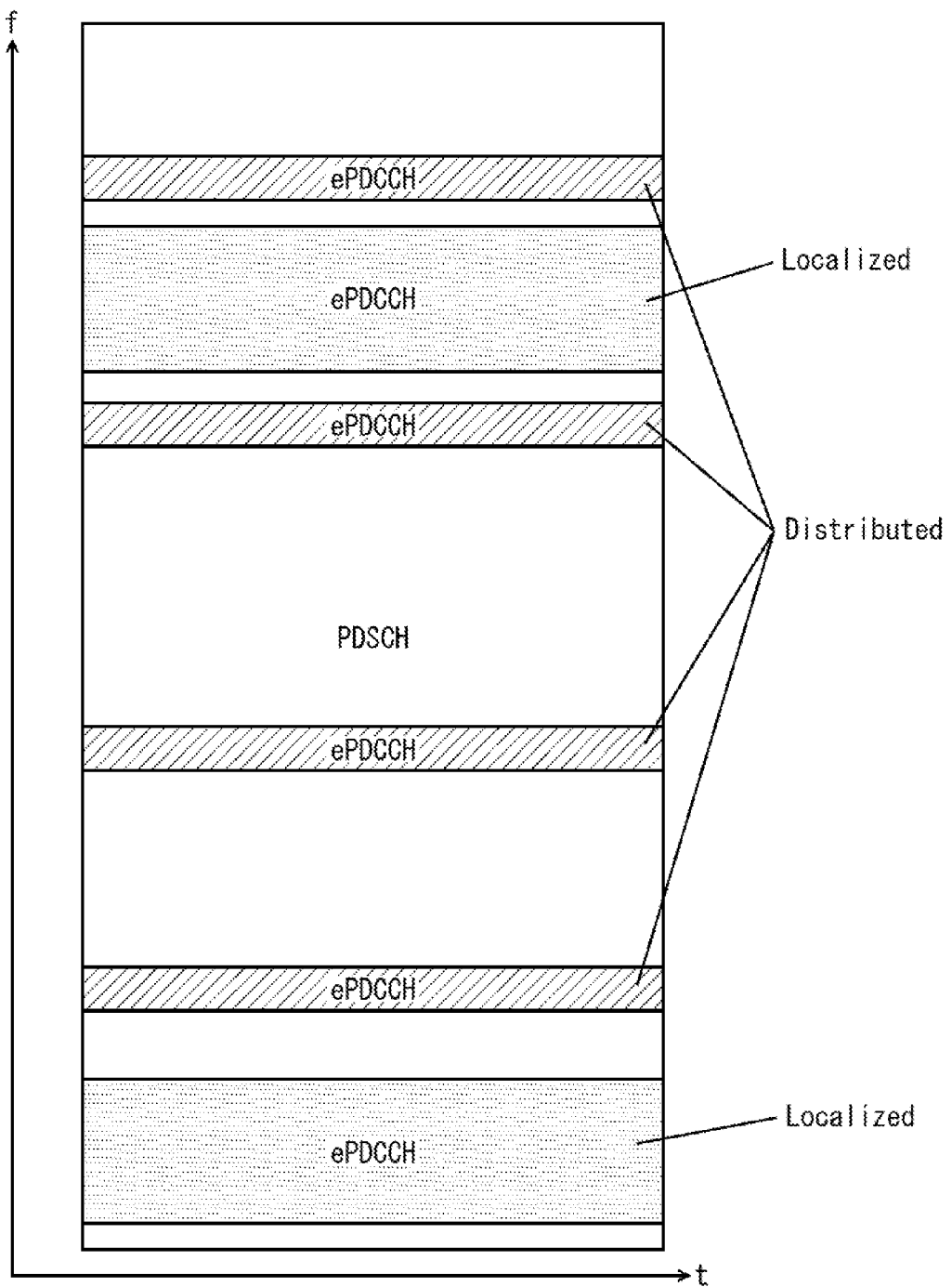
FIG. 6 is a diagram showing an example of a subframe in which "Localized ePDCCH" and "Distributed ePDCCH" exist together.

FIG. 6 is a diagram showing an example of a subframe in which a "Localized ePDCCH" and a "Distributed ePDCCH" exist together. As shown in FIG. 6, in a case where "Localized ePDCCH" and "Distributed ePDCCH" exist together, the wireless communication device NE21 and the wireless communication device NE22 may regard the ePDCCH to which the specific DMRS is transmitted, as the "Distributed ePDCCH". By doing so, measurement can be performed while suppressing the influence of the frequency fading when measuring the reception power of the specific DMRS, and thus it is possible to increase the measurement accuracy.

In addition, the wireless communication device NE21 and the wireless communication device NE22 may change the RB for transmitting the specific DMRS between subframes. That is, the reception power can be measured while further suppressing the influence of the frequency fading by changing the placement of the RB including both the ePDCCH and the specific DMRS at each subframe. The terminal UE2 specifies the resource of the ePDCCH at each subframe and measures the reception power of the specific DMRS for the movement control. In addition, the terminal UE2 may not perform the measurement at each subframe, but may perform this at each slot or at every few slots.

Configuration of Terminal UE2 of the Second Embodiment

Figure 7:
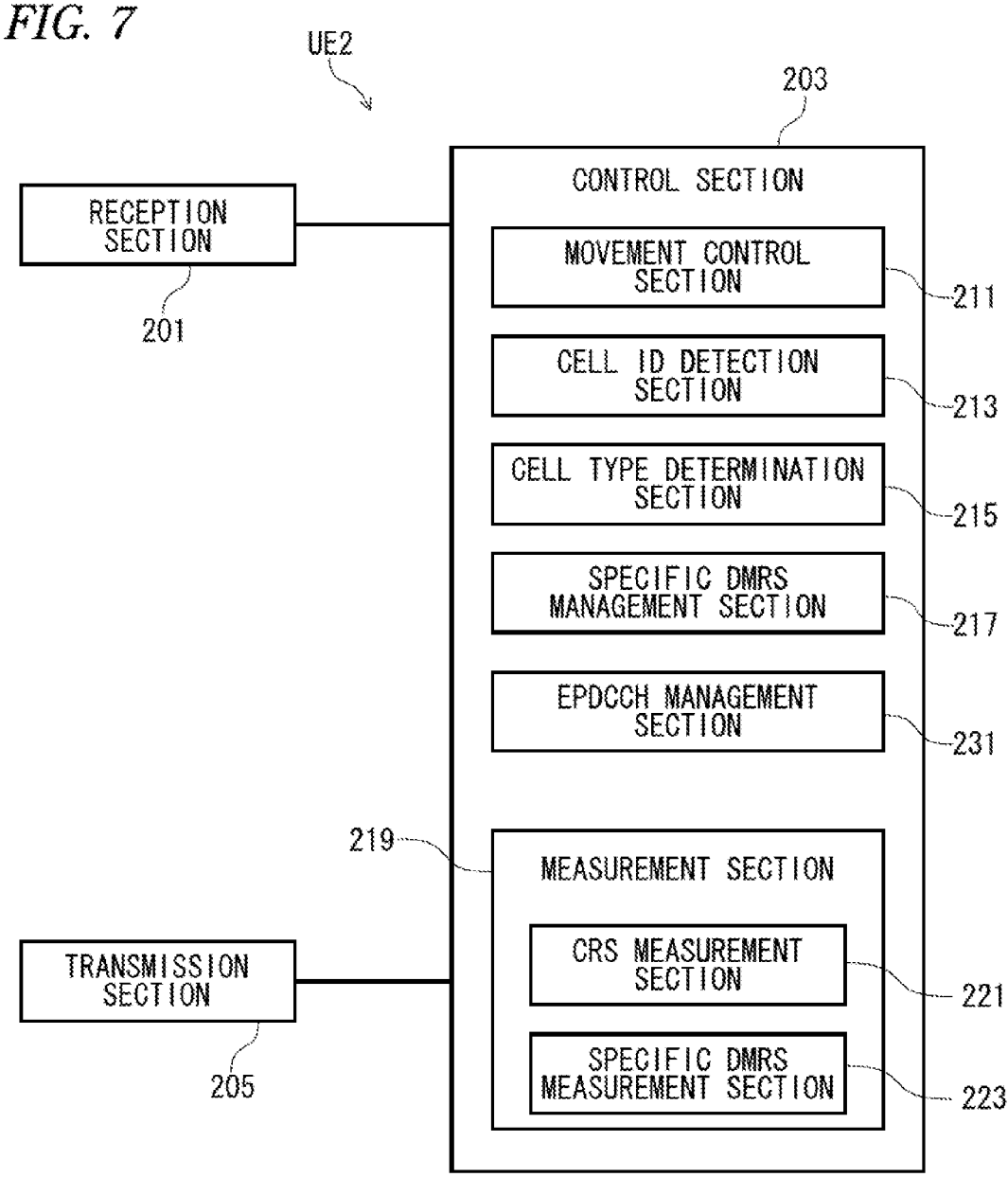
FIG. 7 is a block diagram of the terminal UE2 constituting the wireless communication system of the second embodiment.

FIG. 7 is a block diagram of a terminal UE2 constituting a wireless communication system of the second embodiment. As shown in FIG. 7, the terminal UE2 of the second embodiment includes a reception section 201, a control section 203, and a transmission section 205. The control section 203 includes a movement control section 211, a cell ID detection section 213, a cell type determination section 215, a specific DMRS management section 217, an ePDCCH management section 231, and a measurement section 219. The measurement section 219 includes a CRS measurement section 221, and a specific DMRS measurement section 223.

The reception section 201 receives, in response to an instruction from the control section 203, through the downlink of the cell to which the terminal UE2 is connected, the notification information or the control information such as specific control information. Further, the reception section 201 outputs the received control information to the control section 203. Further, the reception section 201 measures the CRS, in response to an instruction from the CRS measurement section 221 of the measurement section 219 included in the control section 203. The reception section 201 transmits the measurement result of the CRS to the CRS measurement section 221. Further, the reception section 201 measures the DMRS, in response to the instruction from the specific DMRS measurement section 223 of the measurement section 219 included in the control section 203. The reception section 201 transmits the measurement result of the DMRS to the specific DMRS measurement section 223. The reception section 201 receives the synchronization signal in response to the instruction from the cell ID detection section 213 of the control section 203. The reception section 201 transmits the received synchronization signal to the cell ID detection section 213.

The control section 203 instructs the reception section 201 to receive the notification information or the control information such as specific control information. The control information received by the reception section 201 is input to the control section 203. Information regarding the measurement of the reception power of the cell included in the control information which is input to the control section 203 is input to the movement control section 211 of the control section 203. If the measurement of the adjacent cell is instructed from the movement control section 211, the control section 203 starts the measurement of the adjacent cell.

Hereinafter, each of components included in the control section 203 will be described.

The movement control section 211 determines whether to perform a reselection of the adjacent cell, based on control information regarding the cell reselection which is input from the control section 203 and the reception power or the reception quality of its own cell and the adjacent cell when the terminal UE1 is in the idle state. On the other hand, the movement control section 211 prepares a measurement report based on the measurement configuration which is input from the control section 203 and the reception power or the reception quality of its own cell and the adjacent cell when the terminal UE2 is in the connected state. The measurement report prepared by the movement control section 211 is transmitted to the transmission section 205.

In a case where the cell type of its own cell is the cell (cell of the related art) notifying a PDCCH, the movement control section 211 instructs the CRS measurement section 221 of the measurement section 219 to measure the reception power or the reception quality of its own cell. On the other hand, in a case where the cell type of its own cell is "the cell of the additional carrier type", the movement control section 211 instructs the specific DMRS measurement section 223 of the measurement section 219 to measure the reception power or the reception quality of its own cell.

If it is determined that it is desirable to reselect the adjacent cell when the terminal UE2 is in the idle state, the movement control section 211 outputs the determination result to the control section 203. On the other hand, if it is determined to report a measurement report based on the measurement configuration when the terminal UE2 is in the connected state, the movement control section 211 prepares the measurement report so as to output to the transmission section 205. Further, if it is determined to start the measurement of the adjacent cell based on the reception power or the reception quality of its own cell which is input from the measurement section 219 when the terminal UE2 is in the connected state, the movement control section 211 instructs the cell ID detection section 213 to detect the cell.

The cell ID detection section 213 instructs the reception section to receive the synchronization signal. The cell ID detection section 213 detects the cell ID of the adjacent cell, based on the synchronization signal which is input from the reception section. The cell ID detection section 213 outputs the detected cell ID to the cell type determination section 215. In addition, the cell ID detection section 213 acquires information necessary for detecting the cell ID of the adjacent cell (for example, a detection signal corresponding to the cell ID) from the control section 203. The cell ID detection section 213 may instruct the reception section to detect the detection signal and may detect the adjacent cell based on the detection signal received by the reception section. In this case, the control section 203 may have a method to know a detection signal corresponding to the cell ID from the notification information or the specific control information.

The cell type determination section 215 determines whether the cell type of the cell ID detected by the cell ID detection section 213 is "the cell of the additional carrier type" or the cell of the related art notifying a PDCCH. If it is determined that the cell type of the cell ID is "the cell of the additional carrier type", the cell type determination section 215 outputs the cell ID to the ePDCCH management section 231. On the other hand, if it is determined that the cell type of the cell ID is the cell of the related art, the cell type determination section 215 outputs the cell ID to the CRS measurement section 221 of the measurement section 219. If the resource of the ePDCCH is input from the ePDCCH management section 231, the cell type determination section 215 outputs the cell ID and the resource of the ePDCCH to the specific DMRS management section 217.

Hereinafter, a cell type determination method performed by the cell type determination section 215 will be described. The cell type determination section 215 determines a cell type by performing any one of the determination method examples described below.

First Determination Method Example

The cell type determination section 215 determines whether the cell type is "the cell of the additional carrier type" or the cell of the related art from frequencies.

Second Determination Method Example

In the method, the synchronization signal of the cell of the additional carrier type is different from the synchronization signal of the cell of the related art. That is, the cell of the additional carrier type uses the sequence obtained by inverting the sequence of the Primary Synchronization Signals (PSS) in the subframe number 0 and the subframe number 5. Accordingly in a case of the cell of the additional carrier type, if the PSS of the subframe number 0 and the PSS of the subframe number 5 are added to each other, the size becomes zero, whereas if they are subtracted from each other, the size becomes double. On the other hand, in a case of the cell of the related art, if the PSS of the subframe number 0 and the PSS of the subframe number 5 are added to each other, the size becomes double, whereas if they are subtracted from each other, the size becomes zero. The cell type determination section 215 determines whether the cell type is "the cell of the additional carrier type" or the cell of the related art, based on each calculation result obtained by the addition and the subtraction of the PSS of the subframe number 0 and the PSS of the subframe number 5.

Third Determination Method Example

In the method, the synchronization signal of the cell of the additional carrier type is placed at a resource located in a position different from that of the synchronization signal of the cell of the related art. The cell type determination section 215 attempts to detect the synchronization signals of both the cell of the additional carrier type and the cell of the related art. In a case where the synchronization signal is detected, the cell type determination section 215 determines whether the cell type is the cell of the additional carrier type or the cell of the related art depending on the position of the detected synchronization signal.

Fourth Determination Method Example

The cell type determination section 215 determines whether the cell type is the cell of the additional carrier type or the cell of the related art depending on the Cyclic Redundancy Check (CRC) of the Master Information Block (MIB). The cell of the additional carrier type is configured such that the resource used in notification of MIB has the different RE level. In a case of using CRC in the cell of the related art, since the MIB of the cell of the additional carrier type becomes an error, the cell type determination section 215 can determine the type of cell.

Fifth Determination Method Example

In the method, information indicating whether or not the cell type is the cell of the additional carrier type is included in the notification information. The cell type determination section 215 determines whether or not the cell type is the cell of the additional carrier type, based on the information included in the notification information. In addition, the information included in the notification information may be a flag indicating that the cell type is the cell of the additional carrier type.

Sixth Determination Method Example

In the method, information indicating whether or not the adjacent cell is the cell of the additional carrier type is included in the notification information. In addition, the information may be a flag indicating whether or not all adjacent cells are cells of the additional carrier type. Further, the information may be an adjacent cell list indicating whether or not the cell type is the cell of the additional carrier type for each adjacent cell identifier. Further, the cell type determination section 215 may determine which one a network will notify, depending on the situation. In this case, a method in which the network performs notification at Choice may be used. The cell type determination section 215 compares a cell ID detected by the cell ID detection section 213 from the synchronization signal with the adjacent cell list, and determines whether or not the cell type is the cell of the additional carrier type.

In addition, the cell type determination section 215 may determine a cell type by a method other than the methods described above.

If a cell ID is input, the CRS measurement section 221 of the measurement section 219 informs the reception section 201 of the resource of the CRS corresponding to the cell ID which is set in advance, and instructs the reception section 201 to measure the CRS. The CRS measurement section 221 calculates the reception power or the reception quality based on the measurement result of the CRS which is input from the reception section 201, and outputs the calculation result to the movement control section 211.

If the cell ID is input, the ePDCCH management section 231 derives the resource of the ePDCCH corresponding to the cell ID. In addition, the ePDCCH management section 231 outputs only the resource of the ePDCCH on the RB including the specific DMRS to the cell type determination section 215. In addition, the resource of the ePDCCH may be any value by which the specific DMRS management section 217 can specify the resource in which the specific DMRS is placed. For example, the RB number is also possible.

Hereinafter, a deriving method of the resource of the ePDCCH by the ePDCCH management section 231 will be described. The ePDCCH management section 231 specifies the resource of the ePDCCH by performing any one of the deriving methods described below.

First Deriving Method Example

The ePDCCH management section 231 holds a table or a calculation expression for deriving a resource of the ePDCCH from a cell ID. The ePDCCH management section 231 specifies the resource of the ePDCCH corresponding to the cell ID which is input, based on the table or the calculation expression.

Second Deriving Method Example

In the example, the same resource is used between cells, as the resource of the ePDCCH. In this case, the ePDCCH management section 231 specifies the resource of the ePDCCH common to the cells that is held in advance.

Third Deriving Method Example

In the example, the resource of the ePDCCH of an own cell and the resource of the ePDCCH of an adjacent cell are included in the notification information of its own cell. In this case, the ePDCCH management section 231 specifies the resource of the ePDCCH corresponding to the cell ID which is input, by receiving the notification information of its own cell.

Fourth Specification Method Example

When the terminal UE2 is in a state connected with its own cell, the terminal UE2 is notified of information regarding the resource of the ePDCCH of the adjacent cell, by specific control information transmitted from its own cell. In this case, the ePDCCH management section 231 specifies the resource of the ePDCCH corresponding to the cell ID which is input, by receiving the specific control information of its own cell.

Fifth Specification Method Example

The ePDCCH management section 231 holds a table or a calculation expression for deriving the resource of the ePDCCH. The ePDCCH management section 231 specifies the list of resources in which the ePDCCH may exist, by the table or the calculation expression. The specific DMRS management section 217 specifies the resource of the ePDCCH by blind decoding the list of resources in which the ePDCCH may exist. By doing so, it is possible to place the ePDCCH having some degree of freedom.

In addition, the ePDCCH management section 231 may specify the resource of the ePDCCH, using a method other than the methods described above.

If the cell ID and the resource of the ePDCCH are input, the specific DMRS management section 217 specifies the DMRS on the RB to which the resource of the ePDCCH is transmitted, as a specific DMRS. The specific DMRS management section 217 outputs the resource in which the specific DMRS is placed and the cell ID to the specific DMRS measurement section 223 of the measurement section 219.

If the cell ID and the resource of the specific DMRS are input, the specific DMRS measurement section 223 of the measurement section 219 notifies the reception section 201 of the cell ID and the resource of the specific DMRS, and instructs the reception section 201 to measure the DMRS. The specific DMRS measurement section 223 calculates the reception power or reception quality based on the measurement result of DMRS which is input from the reception section 201, and outputs the calculation result to the movement control section 211.

The transmission section 205 transmits the random access preamble, the control signal response, data, or the like. Further, the transmission section 205 transmits the UL packet addressed to the wireless communication device NE21 or NE22, at the transmission timing corresponding to the wireless communication device.

Figure 8:
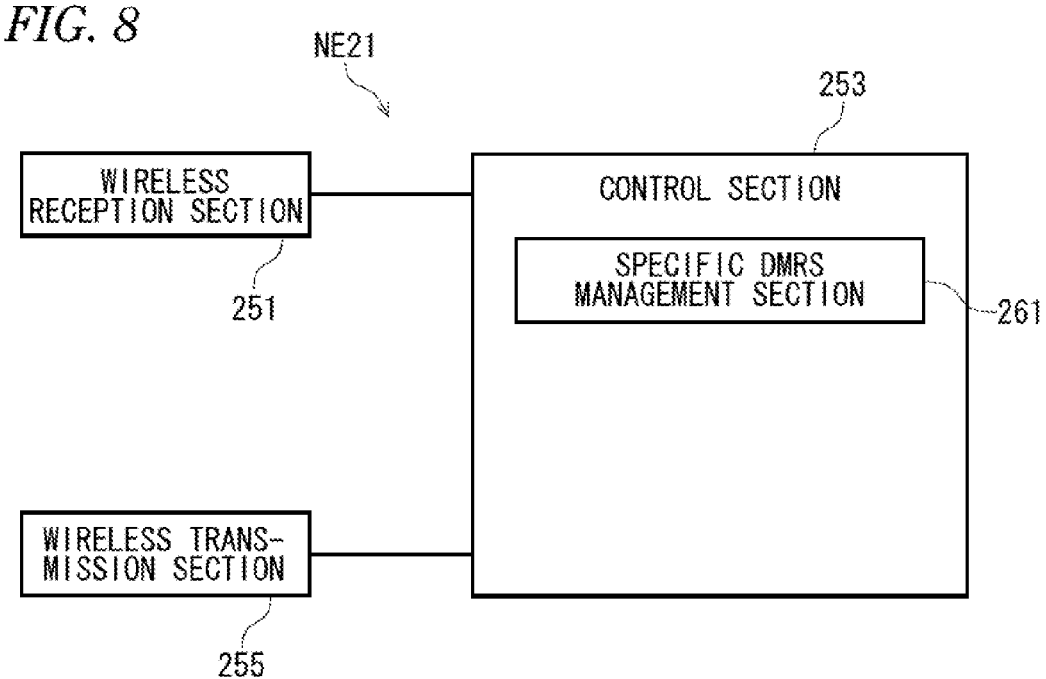
FIG. 8 is a block diagram of a wireless communication device NE21 constituting the wireless communication system of the second embodiment.

Configuration of a Wireless Communication Device NE21 of the Second Embodiment FIG. 8 is a block diagram of a wireless communication device NE21 constituting a wireless communication system of the second embodiment. As shown in FIG. 8, the wireless communication device NE21 of the second embodiment includes a wireless reception section 251, a control section 253, and a wireless transmission section 255. The control section 253 includes a specific DMRS management section 261.

The wireless reception section 251 receives a random access preamble, a control signal response, or the like which is transmitted from the terminal UE2, so as to output to the control section 253. Further, the wireless reception section 251 receives the UL packet transmitted from the terminal UE2 so as to output to the control section 253.

In a case where a cell provided by the wireless communication device NE21 is used as "the cell of the additional carrier type", the control section 253 determines the resource of the ePDCCH transmitted on the RB including the specific DMRS, using a method capable of detecting the terminal UE2, and outputs information regarding the determined resource to the specific DMRS management section 261. Further, the control section 253 transmits an instruction to perform precoding for all terminals on the specific DMRS or an instruction not to perform precoding on the specific DMRS, to the specific DMRS management section 261. The control section 253 generates the notification information so as to output to the wireless transmission section 255. In a case of using the specific DMRS, the control section 253 outputs a packet corresponding to the specific DMRS to the wireless transmission section 255, with performing precoding for all terminals on the packet corresponding to the specific DMRS or without performing the precoding on the packet corresponding to the specific DMRS. The control section 253 generates a random access response corresponding to a random access preamble so as to output to the wireless transmission section 255. The control section 253 generates specific control information for each terminal so as to output to the wireless transmission section 255.

The specific DMRS management section 261 uses the DMRS of the RB to which the resource of the ePDCCH which is input from the control section 253 as the specific DMRS is transmitted. Further, the specific DMRS management section 261 outputs the specific DMRS to the wireless transmission section 255 in response to the instruction from the control section 253, with performing precoding for all terminals on the specific DMRS or without performing the precoding on the specific DMRS.

The wireless transmission section 255 transmits the specific DMRS which is input from the specific DMRS management section 261 to the terminal UE2. The wireless transmission section 255 transmits data which is input from the control section 253, notification information, specific control information, random access response, or the like to the terminal UE2.

Cell Reselection Method of the Terminal UE2 in the Second Embodiment

Figure 9:
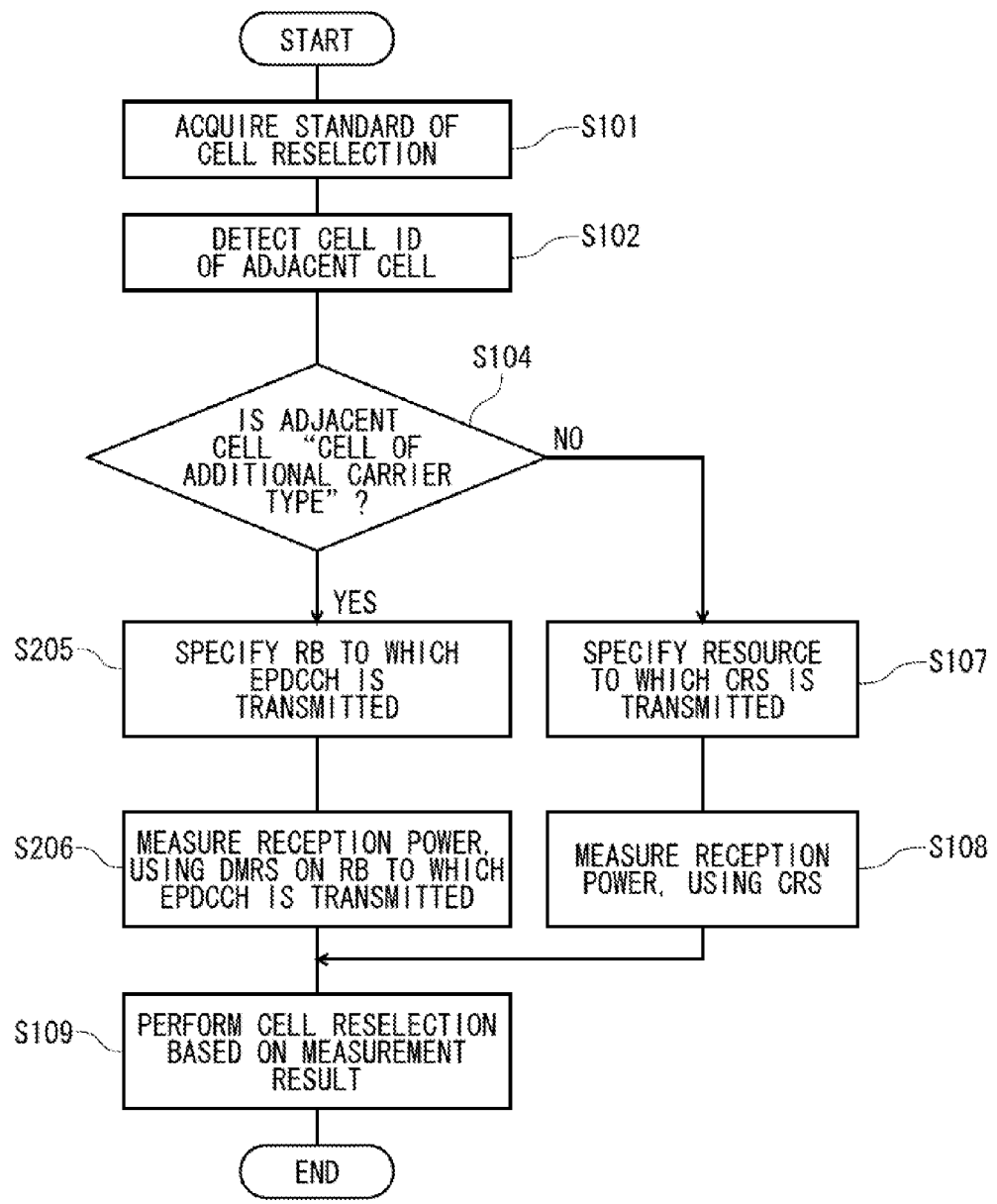
FIG. 9 is a flowchart when the terminal UE2 in the idle state performs a cell reselection in the wireless communication system of the second embodiment.

Hereinafter, with reference to FIG. 9, an operation when the terminal UE2 in the idle state performs a cell reselection will be described. FIG. 9 is a flowchart when the terminal UE2 in the idle state performs a cell reselection in the wireless communication system of the second embodiment. In addition, in FIG. 9, the same processing steps as the steps shown in FIG. 4 in the first embodiment are designated by the same reference numerals. The terminal UE2 is connected to the cell (own cell) provided by the wireless communication device NE21 and is in the idle state.

As shown in FIG. 9, the terminal UE2 acquires a standard or the like of the cell reselection using the notification information from its own cell (step S101). Next, the terminal UE2 detects a cell ID of an adjacent cell (step S102). Next, the terminal UE2 determines whether or not the adjacent cell is "the cell of the additional carrier type" (step S104). At this time, for example, the terminal UE2 attempts both a cell ID detection method for the additional carrier type and a cell ID detection method of the related art by the blind decoding, in step S102. The terminal UE2 determines whether or not the cell type is the cell of the additional carrier type, depending on the method by which the cell ID is detected. Further, after the cell type is determined to be the cell of the additional carrier type, the terminal UE2 may attempt to detect the cell ID of the cell.

In step S104, in a case where the cell type is determined to be the cell of the additional carrier type (that is, in a case of Yes), the process proceeds to step S205, but in a case where the cell type is not determined to be the cell of the additional carrier type (that is, in a case of No), the process proceeds to step S107. In step S205, the terminal UE2 specifies the RB to which the ePDCCH is transmitted. Next, the terminal UE2 measures the reception power, using the specific DMRS which is included in the RB to which the ePDCCH is transmitted (step S206). On the other hand, in step S107, the terminal UE2 specifies the resource to which the CRS is transmitted, from the cell ID. Next, the terminal UE2 measures the reception power, using the CRS transmitted in the resource of the specified cell ID (step S108).

If the measurement of the reception power in step S206 or S108 is successful, the terminal UE2 proceeds to step S109. In step S109, the terminal UE2 performs a cell reselection, based on the measurement result of the reception power. In addition, the terminal UE2 may use Distributed ePDCCH.

In this manner, the terminal UE2 measures reception power of the adjacent cell and this enables a cell reselection of a better cell for all of the terminal UE2 and the wireless communication devices NE21 and NE22. Further, since the wireless communication devices NE21 and NE22 perform precoding for all terminals or not perform the precoding only on the specific DMRS on the RB to which the ePDCCH is transmitted so as to enable data transmission, it is possible to maintain the transmission characteristics in the data region. Further, without adding a new reference signal, it is possible to measure the reception power of the cell for cell reselection, and thus the design of the system and the terminal becomes easy. In addition, by using the same method as the methods described above, the terminal UE2 in the connected state may perform the movement control. That is, in step S109, the terminal UE2 prepares a measurement result report based on the measurement result of the reception power.

As described above, according to the present embodiment, since the terminal UE2 can acquire the reception power by measuring the specific DMRS on the RB to which the ePDCCH is transmitted, the movement control is possible without using the CRS which is used as the reference signal in the LTE system. Further, if the specific DMRS on the RB to which the ePDCCH is transmitted is used, the terminal UE2 in the idle state can perform the cell reselection in the same order as in the cell reselection of the related art. Thus, it is possible to reduce the processing load of the terminal UE2, and a new reference signal may not be added. Further, the resource placing in the cell is easy.

Third Embodiment

A wireless communication system of the third embodiment will be described. The wireless communication system of the third embodiment is different from the wireless communication system of the second embodiment in that the terminal limits the specific DMRS, on which precoding for all terminals to be measured for movement control is performed or the precoding is not performed, to the DMRS on the RB to which the ePDCCH of the specific subframe is transmitted. Since the third embodiment is the same as the second embodiment except for the above point, the description regarding the configurations of the terminal and the wireless communication device which constitute the wireless communication system of this embodiment will be omitted.

Figure 10:
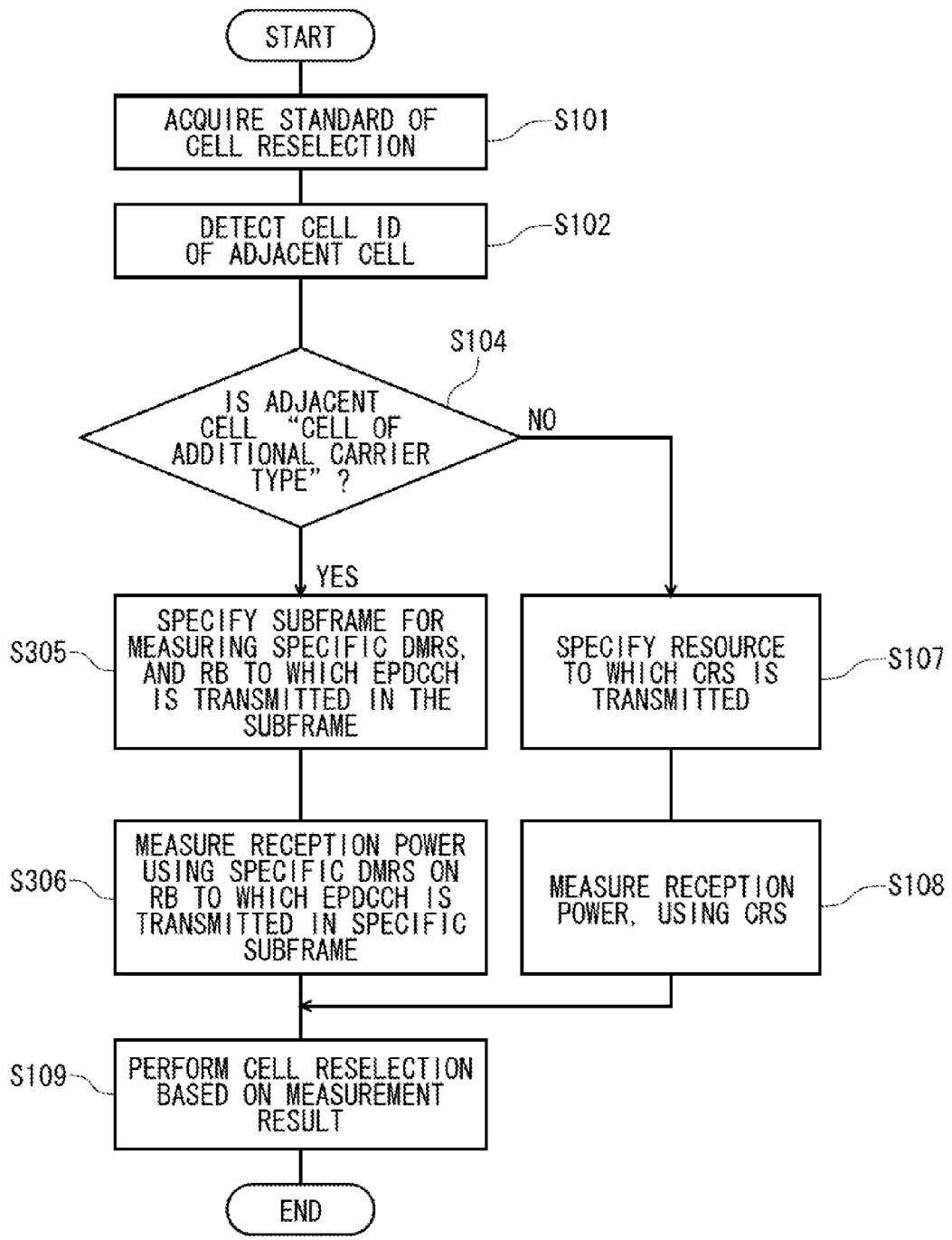
FIG. 10 is a flowchart when a terminal UE3 in an idle state performs a cell reselection in a wireless communication system of a third embodiment.

Hereinafter, with reference to FIG. 10, an operation when the terminal UE3 in the idle state performs a cell reselection will be described. FIG. 10 is a flowchart when the terminal UE3 in the idle state performs a cell reselection in the wireless communication system of the third embodiment. In addition, in FIG. 10, the same processing steps as the steps shown in FIG. 9 in the second embodiment are designated by the same reference numerals. The terminal UE3 is connected to the cell (own cell) provided by the wireless communication device NE3 and is in the idle state.

As shown in FIG. 10, the terminal UE3 acquires a standard or the like of the cell reselection using the notification information from its own cell (step S101). Next, the terminal UE3 detects a cell ID of an adjacent cell (step S102). Next, the terminal UE3 determines whether or not the adjacent cell is "the cell of the additional carrier type" (step S104). At this time, for example, the terminal UE3 attempts both a cell ID detection method for the additional carrier type and a cell ID detection method of the related art by the blind decoding in step S102. The terminal UE3 determines whether or not the cell type is the cell of the additional carrier type, depending on the method by which the cell ID is detected. Further, after the cell type is determined to be the cell of the additional carrier type, the terminal UE3 may attempt to detect the cell ID of the cell.

In step S104, in a case where the cell type is determined to be the cell of the additional carrier type (that is, in a case of Yes), the process proceeds to step S305, but in a case where the cell type is not determined to be the cell of the additional carrier type (that is, in a case of No), the process proceeds to step S107. In step S305, the terminal UE3 specifies the subframe to be measured for the movement control, and specifies the RB to which the ePDCCH is transmitted in the specified subframe. Next, the terminal UE3 measures the reception power, using the specific DMRS which is included in the RB to which the ePDCCH is transmitted in the subframe (step S306). On the other hand, in step S107, the terminal UE3 specifies the resource to which the CRS is transmitted, from the cell ID. Next, the terminal UE3 measures the reception power, using the CRS transmitted in the resource of the specified cell ID (step S108).

If the measurement of the reception power in step S306 or S108 is successful, the terminal UE3 proceeds to step S109. In step S109, the terminal UE3 performs a cell reselection, based on the measurement result of the reception power.

In this manner, with respect to the resource on the ePDCCH, it is possible to transmit the specific DMRS on the RB to which the ePDCCH is transmitted, while causing the specific DMRS to have directivity, in some subframes, by limiting the subframe for transmitting the specific DMRS. In this manner, it is possible to cause the ePDCCH to have directivity and transmit the ePDCCH, thereby using the resource of the ePDCCH efficiently. As a result, it is possible to reduce the probability that a control signal cannot be transmitted in the ePDCCH. In addition, by using the same method as the above method, the terminal UE3 in the connected state may perform movement control. In other words, in step S109, the terminal UE3 prepares a measurement result report, based on the measurement result of the reception power.

In addition, in the present embodiment, the DMRS on the RB to which the ePDCCH is transmitted in the specific subframe is described as the specific DMRS, but the DMRS included in the specific RB in the specific subframe may be regarded as the specific DMRS. That is because the amount of data to be transmitted without having directivity can be suppressed by limiting the subframe, even if the DMRS without directivity is transmitted using the data region. Then, while limiting the subframe, the number of the reference signals capable of being measured in the subframe increases, and thus it is possible to improve the measurement accuracy. Further, in the present embodiment, the DMRS on the RB to which the ePDCCH is transmitted in the specific subframe is described as the specific DMRS, but similarly to the second embodiment, the RB including the specific DMRS may be limited to some RBs among RBs to which the ePDCCH is transmitted.

Further, the specific subframe may be limited to the subframe having high probability that the common search space is used on the ePDCCH, such as SIB1, a random access response, or a paging. By doing so, a probability that the specific DMRS is used for decoding the common search space is increased, and the radio resource can be used more efficiently.

Fourth Embodiment

A wireless communication system of the fourth embodiment will be described with reference to FIGS. 11 to 14. The wireless communication system of the fourth embodiment is different from the wireless communication system of the second embodiment in that the specific DMRS is limited to the DMRS of a specific antenna port. The fourth embodiment is the same as the second embodiment except for the above point.

Figure 11:
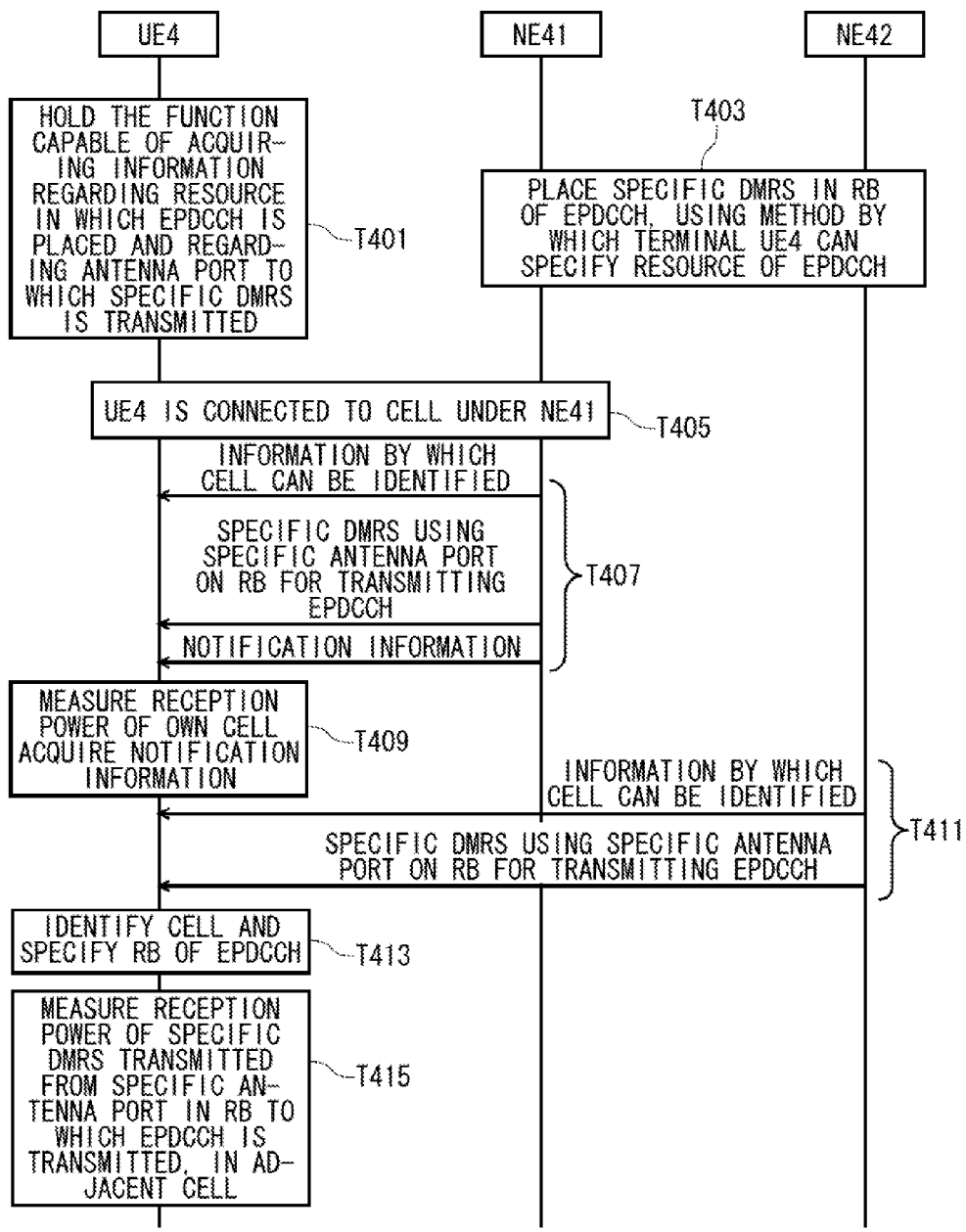
FIG. 11 is a diagram showing an example of a timing chart when a terminal UE4 measures an adjacent cell for movement control in a wireless communication system of a fourth embodiment.

FIG. 11 is a diagram showing an example of a timing chart when a terminal UE4 measures an adjacent cell for movement control in a wireless communication system of a fourth embodiment. As shown in FIG. 11, a function capable of acquiring information regarding the resource in which the ePDCCH transmitted by a cell is placed and regarding the antenna port to which the specific DMRS is transmitted is configured in advance, in the terminal UE4 (T401). In addition, the same method as the second embodiment can be applied to a method specifying a resource in which the ePDCCH is placed. Further, the same method as the first embodiment can be applied to a determination method of the cell type. On the other hand, the wireless communication device NE41 and the wireless communication device NE42 which are shown in FIG. 11 place the ePDCCH such that the terminal UE4 can specify the resource of the ePDCCH as the second embodiment (T403).

In an example shown in FIG. 11, the terminal UE4 is connected to a cell under the wireless communication device NE41 (T405). The cell under the wireless communication device NE41 notifies information by which a cell can be identified (for example, a synchronization signal), a specific DMRS to be transmitted, using the specific antenna port on a RB for transmitting the ePDCCH, and notification information (T407). The terminal UE4 measures the reception power of the cell (own cell) under the wireless communication device NE41, and acquires notification information (T409).

The cell under wireless communication device NE42 notifies information by which a cell can be identified (for example, a synchronization signal) and the specific DMRS to be transmitted, using the specific antenna port on the RB for transmitting the ePDCCH (T411). In a case where the terminal UE4 is in an idle state, if it is determined to perform a cell reselection on an adjacent cell, based on the control information included in the notification information, the terminal UE4 acquires the synchronization signal of the cell under the wireless communication device NE42. Then, after identifying the cell from the acquired synchronization signal, the terminal UE4 specifies the RB of the ePDCCH and specifies the specific antenna port to which the specific DMRS is transmitted (T413). Then, the terminal UE4 measures the reception power of the specific DMRS transmitted from the specific antenna port in the RB to which the ePDCCH is transmitted, in the cell (adjacent cell) under the wireless communication device NE42 (T415).

In a case where the terminal UE4 is in the connected state, the terminal UE4 acquires measurement configuration that is included in the specific control information from its own cell. If it is determined to be necessary to measure the adjacent cell, based on the measurement configuration, the terminal UE4 acquires the synchronization signal of a cell under the wireless communication device NE42. Then, after identifying the cell from the acquired synchronization signal, the terminal UE4 specifies the RB in which the ePDCCH is placed and specifies the specific antenna port to which the specific DMRS is transmitted. Then, the terminal UE4 measures the reception power of the specific DMRS transmitted from the specific antenna port in the RB to which the ePDCCH is transmitted, in the cell (adjacent cell) under the wireless communication device NE42.

In this manner, since the terminal UE4 can measure the reception power of its own cell and the adjacent cell by measuring the specific DMRS transmitted from the specific antenna port in the RB to which the ePDCCH is transmitted, even in an idle state or connected state, it is possible to perform the movement control. Further, the DMRS transmitted from the specific antenna port in the RB to which the ePDCCH is transmitted is used as the specific DMRS, and thus the terminal UE4 can use the DMRS transmitted from the specific antenna port in decoding of the common search space of the ePDCCH. Therefore, it is possible to reduce the effects of the decrease in transmission efficiency by transmitting a specific DMRS. In addition, the terminal UE4 may perform even the decoding of the UE specific search space, using the same specific DMRS. In that case, since it is not necessary to transmit a DMRS in other antenna ports, the resource can be used in order to transmit the ePDCCH and the data.

Further, in a case where the specific DMRS is transmitted, using a Space Frequency Block Code (SFBC), the terminal UE4 performs the decoding of the ePDCCH, using the SFBC. Further, in a case where the specific DMRS is transmitted in the same RB as in data, if the DMRS for using data in decoding is the specific DMRS which is transmitted, using the SFBC, the terminal UE4 performs the decoding of data, using the SFBC. By doing so, it is possible to decode the ePDCCH or data.

In addition, the wireless communication device NE41 and the wireless communication device NE42 may limit the RB for transmitting the specific DMRS, to a part of RBs to which the ePDCCH is transmitted. By doing so, it is possible to place the ePDCCH in a resource different from the resource obtained by the above-mentioned method. Further, since it is possible to reduce the ePDCCHs on which the precoding for all terminals is performed or not performed, it is possible to efficiently use the resource of the ePDCCH.

In addition, the wireless communication device NE41 and the wireless communication device NE42 may change the RB for transmitting the specific DMRS between subframes. That is, the reception power can be measured while further suppressing the influence of the frequency fading by changing the placement of the RB including both the ePDCCH and the specific DMRS at each subframe. The terminal UE4 specifies the resource of the ePDCCH at each subframe and measures the reception power of the specific DMRS for the movement control. In addition, the terminal UE4 may not perform the measurement at each subframe, but may perform this at each slot or at every few slots.

In addition, the present embodiment may be applied to the first embodiment, the second embodiment and the third embodiment.

Configuration of Terminal UE4 of the Fourth Embodiment

Figure 12:
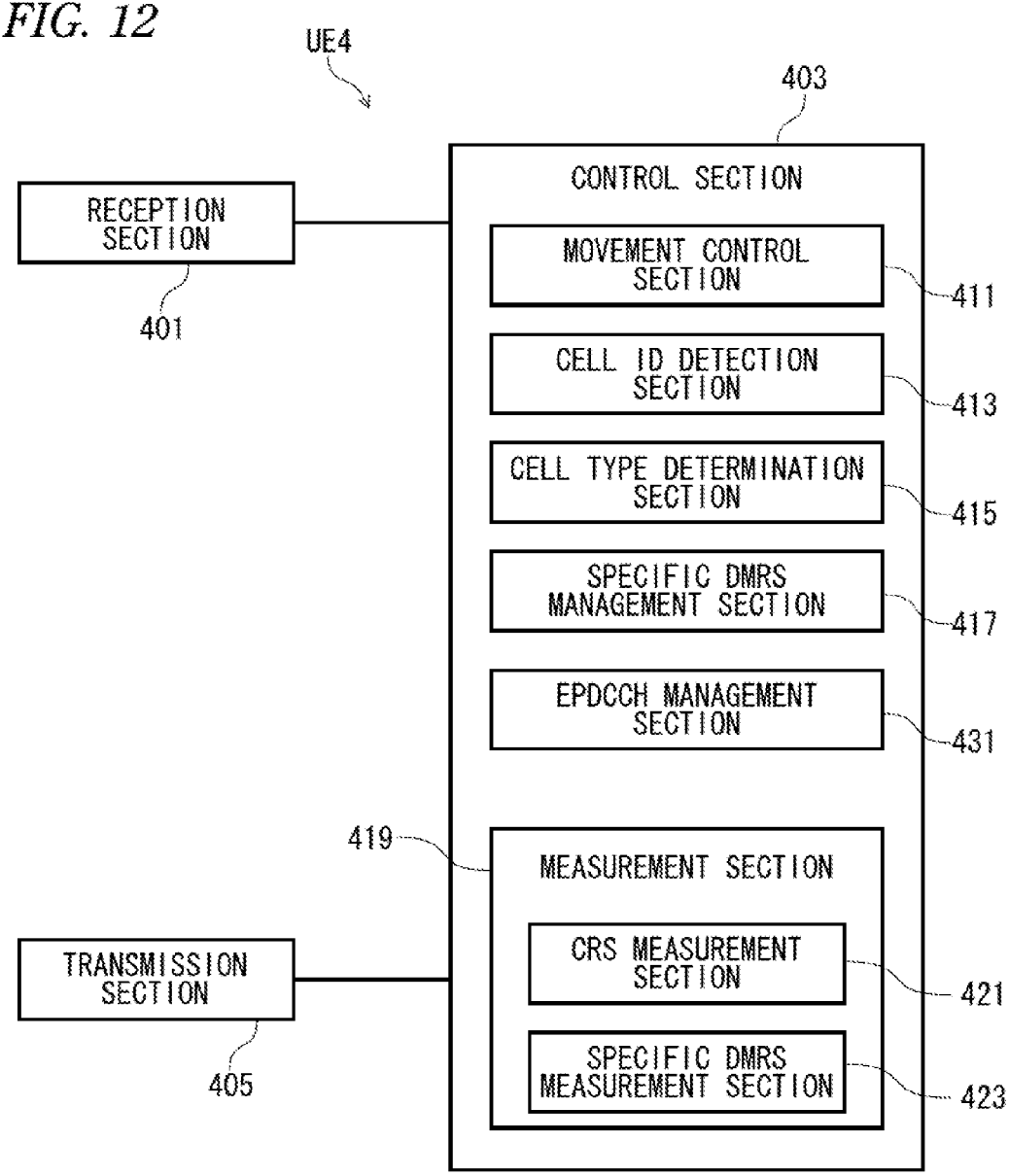
FIG. 12 is a block diagram of the terminal UE4 constituting the wireless communication system of the fourth embodiment.

FIG. 12 is a block diagram of a terminal UE4 constituting a wireless communication system of the fourth embodiment. As shown in FIG. 12, the terminal UE4 of the fourth embodiment includes a reception section 401, a control section 403, and a transmission section 405. The control section 403 includes a movement control section 411, a cell ID detection section 413, a cell type determination section 415, a specific DMRS management section 417, an ePDCCH management section 431, and a measurement section 419. The measurement section 419 includes a CRS measurement section 421, and a specific DMRS measurement section 423.

The reception section 401 receives, in response to an instruction from the control section 403, through the downlink of the cell to which the terminal UE4 is connected, the notification information or the control information such as specific control information. Further, the reception section 401 outputs the received control information to the control section 403. Further, the reception section 401 measures the CRS, in response to an instruction from the CRS measurement section 421 of the measurement section 419 included in the control section 403. The reception section 401 transmits the measurement result of the CRS to the CRS measurement section 421. Further, the reception section 401 measures the DMRS, in response to the instruction from the specific DMRS measurement section 423 of the measurement section 419 included in the control section 403. The reception section 401 transmits the measurement result of the DMRS to the specific DMRS measurement section 423. The reception section 401 receives the synchronization signal in response to the instruction from the cell ID detection section 413 of the control section 403. The reception section 401 transmits the received synchronization signal to the cell ID detection section 413.

The control section 403 instructs the reception section 401 to receive the notification information or the control information such as specific control information. The control information received by the reception section 401 is input to the control section 403. Information regarding the measurement of the reception power of the cell included in the control information which is input to the control section 403 is input to the movement control section 411 of the control section 403. If the measurement of the adjacent cell is instructed from the movement control section 411, the control section 403 starts the measurement of the adjacent cell.

Hereinafter, each of components included in the control section 403 will be described.

The movement control section 411 determines whether to perform a reselection of the adjacent cell, based on control information regarding the cell reselection which is input from the control section 403 and the reception power or the reception quality of its own cell and the adjacent cell when the terminal UE4 is in the idle state. On the other hand, the movement control section 411 prepares a measurement report based on the measurement configuration which is input from the control section 403 and the reception power or the reception quality of its own cell and the adjacent cell when the terminal UE4 is in the connected state. The measurement report prepared by the movement control section 411 is transmitted to the transmission section 405.

In a case where the cell type of its own cell is the cell (cell of the related art) notifying a PDCCH, the movement control section 411 instructs the CRS measurement section 421 of the measurement section 419 to measure the reception power or the reception quality of its own cell. On the other hand, in a case where the cell type of its own cell is "cell of the additional carrier type", the movement control section 411 instructs the specific DMRS measurement section 423 of the measurement section 419 to measure the reception power or the reception quality of its own cell.

If it is determined that it is desirable to reselect the adjacent cell when the terminal UE4 is in the idle state, the movement control section 411 outputs the determination result to the control section 403. On the other hand, if it is determined to report a measurement report based on the measurement configuration when the terminal UE4 is in the connected state, the movement control section 411 prepares the measurement report so as to output to the transmission section 405. Further, if it is determined to start the measurement of the adjacent cell based on the reception power or the reception quality of its own cell which is input from the measurement section 419 when the terminal UE4 is in the connected state, the movement control section 411 instructs the cell ID detection section 413 to detect the cell.

The cell ID detection section 413 instructs the reception section to receive the synchronization signal. The cell ID detection section 413 detects the cell ID of the adjacent cell, based on the synchronization signal which is input from the reception section 401. The cell ID detection section 413 outputs the detected cell ID to the cell type determination section 415. In addition, the cell ID detection section 413 acquires information necessary for detecting the cell ID of the adjacent cell (for example, a detection signal corresponding to the cell ID) from the control section 403. The cell ID detection section 413 may instruct the reception section 401 to detect the detection signal and may detect the adjacent cell based on the detection signal received by the reception section 401. In this case, the control section 403 may have a method to know a detection signal corresponding to the cell ID from the notification information or the specific control information.

The cell type determination section 415 determines whether the cell type of the cell ID detected by the cell ID detection section 413 is "the cell of the additional carrier type" or the cell of the related art notifying a PDCCH. If it is determined that the cell type of the cell ID is "the cell of the additional carrier type", the cell type determination section 415 outputs the cell ID to the ePDCCH management section 431. On the other hand, if it is determined that the cell type of the cell ID is the cell of the related art, the cell type determination section 415 outputs the cell ID to the CRS measurement section 421 of the measurement section 419. If the resource of the ePDCCH is input from the ePDCCH management section 431, the cell type determination section 415 outputs the cell ID and the resource of the ePDCCH to the specific DMRS management section 417.

Hereinafter, a cell type determination method performed by the cell type determination section 415 will be described. The cell type determination section 415 determines a cell type by performing any one of the determination method examples described below.

First Determination Method Example

The cell type determination section 415 determines whether the cell type is "the cell of the additional carrier type" or the cell of the related art from frequencies.

Second Determination Method Example

In the method, the synchronization signal of the cell of the additional carrier type is different from the synchronization signal of the cell of the related art. That is, the cell of the additional carrier type uses the sequence obtained by inverting the sequence of the Primary Synchronization Signals (PSS) in the subframe number 0 and the subframe number 5. Accordingly, in a case of the cell of the additional carrier type, if the PSS of the subframe number 0 and the PSS of the subframe number 5 are added to each other, the result becomes zero, whereas if they are subtracted from each other, the size becomes double. On the other hand, in a case of the cell of the related art, if the PSS of the subframe number 0 and the PSS of the subframe number 5 are added to each other, the size becomes double, whereas if they are subtracted from each other, the size becomes zero. The cell type determination section 415 determines whether the cell type is "the cell of the additional carrier type" or the cell of the related art, based on each calculation result obtained by the addition and the subtraction of the PSS of the subframe number 0 and the PSS of the subframe number 5.

Third Determination Method Example

In the method, the synchronization signal of the cell of the additional carrier type is placed at a resource located in a position different from that of the synchronization signal of the cell of the related art. The cell type determination section 415 attempts to detect the synchronization signals of both the cell of the additional carrier type and the cell of the related art. In a case where the synchronization signal is detected, the cell type determination section 415 determines whether the cell type is the cell of the additional carrier type or the cell of the related art depending on the position of the detected synchronization signal.

Fourth Determination Method Example

The cell type determination section 415 determines whether the cell type is the cell of the additional carrier type or the cell of the related art depending on the Cyclic Redundancy Check (CRC) of the Master Information Block (MIB). The cell of the additional carrier type is configured such that the resource used in notification of MIB has the different RE level. In a case of using CRC in the cell of the related art, since the MIB of the cell of the additional carrier type becomes an error, the cell type determination section 415 can determine the type of cell.

Fifth Determination Method Example

In the method, information indicating whether or not the cell type is the cell of the additional carrier type is included in the notification information. The cell type determination section 415 determines whether or not the cell type is the cell of the additional carrier type, based on the information included in the notification information. In addition, the information included in the notification information may be a flag indicating that the cell type is the cell of the additional carrier type.

Sixth Determination Method Example

In the method, information indicating whether or not the adjacent cell is the cell of the additional carrier type is included in the notification information. In addition, the information may be a flag indicating whether or not all adjacent cells are cells of the additional carrier type. Further, the information may be an adjacent cell list indicating whether or not the cell type is the cell of the additional carrier type for each adjacent cell identifier. Further, the cell type determination section 415 may determine which one a network will notify, depending on the situation. In this case, a method in which the network performs notification at Choice may be used. The cell type determination section 415 compares a cell ID detected by the cell ID detection section 413 from the synchronization signal with the adjacent cell list, and determines whether or not the cell type is the cell of the additional carrier type.

In addition, the cell type determination section 415 may determine a cell type by a method other than the methods described above.

If a cell ID is input, the CRS measurement section 421 of the measurement section 419 informs the reception section 401 of the resource of the CRS corresponding to the cell ID which is set in advance, and instructs the reception section 401 to measure the CRS. The CRS measurement section 421 calculates the reception power or the reception quality based on the measurement result of the CRS which is input from the reception section 401, and outputs the calculation result to the movement control section 411.

If the cell ID is input, the ePDCCH management section 431 derives the resource of the ePDCCH corresponding to the cell ID. In addition, the ePDCCH management section 431 outputs only the resource of the ePDCCH on the RB including the specific DMRS to the cell type determination section 415. In addition, the resource of the ePDCCH may be any value by which the specific DMRS management section 417 can specify the resource in which the specific DMRS is placed. For example, the RB number is also possible.

Hereinafter, a deriving method of the resource of the ePDCCH by the ePDCCH management section 431 will be described. The ePDCCH management section 431 specifies the resource of the ePDCCH by performing any one of the deriving methods described below.

First Deriving Method Example

The ePDCCH management section 431 holds a table or a calculation expression for deriving a resource of the ePDCCH from a cell ID. The ePDCCH management section 431 specifies the resource of the ePDCCH corresponding to the cell ID which is input, based on the table or the calculation expression.

Second Deriving Method Example

In the example, the same resource is used between cells, as the resource of the ePDCCH. In this case, the ePDCCH management section 431 specifies the resource of the ePDCCH common to the cells that is held in advance.

Third Deriving Method Example

In the example, the resource of the ePDCCH of an own cell and the resource of the ePDCCH of an adjacent cell are included in the notification information of its own cell. In this case, the ePDCCH management section 431 specifies the resource of the ePDCCH for the cell ID which is input, by receiving the notification information of its own cell.

Fourth Specification Method Example

When the terminal UE4 is in a state connected with its own cell, the terminal UE4 is notified of information regarding the resource of the ePDCCH of the adjacent cell, by specific control information transmitted from its own cell. In this case, the ePDCCH management section 431 specifies the resource of the ePDCCH corresponding to the cell ID which is input, by receiving the specific control information of its own cell.

Fifth Specification Method Example

The ePDCCH management section 431 holds a table or a calculation expression for deriving the resource of the ePDCCH. The ePDCCH management section 431 derives a list of resources in which the ePDCCH may exist, by the table or the calculation expression. The specific DMRS management section 417 specifies the resource of the ePDCCH by blind decoding the list of resources in which the ePDCCH may exist. By doing so, it is possible to place the ePDCCH having some degree of freedom.

In addition, the ePDCCH management section 431 may specify the resource of the ePDCCH, using a method other than the methods described above.

If the cell ID and the resource of the ePDCCH are input, the specific DMRS management section 417 derives an antenna port to which the specific DMRS is transmitted, on the RB to which the resource of the ePDCCH is transmitted. The specific DMRS management section 417 outputs the resource information including the antenna port number to which the specific DMRS is transmitted and the cell ID to the specific DMRS measurement section 423. In addition, the specific DMRS management section 417 may output information indicating whether or not reception is performed, using a Space Frequency Block Code (SFBC) to the specific DMRS measurement section 423.

Hereinafter, an antenna port specification method by the specific DMRS management section 417 will be described. The specific DMRS management section 417 specifies the antenna port to which a specific DMRS is transmitted by performing any one of the specification methods described below.

First Specification Method Example

In the example, an antenna port to which a specific DMRS is transmitted is set in advance. The specific DMRS management section 417 is configured such that the specific DMRS is transmitted using, for example, the antenna port number 7. This is because it can be considered that since it is considered that the terminal supports at least one layer, the terminal corresponding to the cell of the additional carrier type can receive the DMRS of at least the antenna port number 7. Further, the specific antenna port number is set to, for example, the antenna port 8. This is because it can be considered that the terminal supporting one layer supports both the antenna port numbers 7 and 8. Further, the specific antenna port number is, for example, 10. By doing so, in a case of transmitting the DMRS in the data region without being precoded as described in the third embodiment, the terminal supporting only one layer can transmit data with directivity, and the directivity of data transmitted on the fourth layer by the terminal supporting four layers is eliminated. That is, the throughput of the terminal, in which the throughput is hardly increased, is not reduced. Further, a plurality of antenna ports may be set instead of one. For example, the antenna port numbers 7 and 8 are set in advance. Further, for example, the antenna port numbers 7 and 9 may be set in advance.

Second Specification Method Example

In the example, whether to use an antenna port to which a specific DMRS is transmitted and Space Frequency Block Code (SFBC) is set in advance. For example, the specific DMRS management section is configured such that the specific DMRS is transmitted, using the antenna port number 7 and the antenna port 9, and is received, using SFBC. By doing so, since it is possible to achieve transmission diversity, the terminal UE4 can perform more accurate reception power measurement.

Third Specification Method Example

In the example, an antenna port number to which a specific DMRS is transmitted is set by notification information or specific control information. The antenna port number to which a specific DMRS is transmitted is input to the specific DMRS management section 417.

Fourth Specification Method Example

In the example, whether to use an antenna port number to which specific DMRS is transmitted and SFBC is set by notification information or specific control information. Whether or not a reception is performed, using the antenna port number to which the specific DMRS is transmitted and SFBC is input, to the specific DMRS management section 417.

In addition, the specific DMRS management section 417 may specify the antenna port number to which the specific DMRS is transmitted, using a method other than the methods described above.

If a cell ID and resource information including an antenna port number to which a specific DMRS is transmitted are input, the specific DMRS measurement section 423 of the measurement section 419 informs the reception section 401 of the cell ID and the resource information, and instructs the reception section 401 to measure the DMRS. In a case where the specific DMRS management section 417 instructs a reception using SFBC, the specific DMRS measurement section 423 instructs the reception section 401 to perform reception, using SFBC. The specific DMRS measurement section 423 calculates the reception power or the reception quality based on the measurement result of the DMRS which is input from the reception section 401, and outputs the calculation result to the movement control section 411.

The transmission section 405 transmits a random access preamble, a control signal response, data, or the like. Further, the transmission section 405 transmits the UL packet addressed to the wireless communication device NE41 or NE42, at the transmission timing corresponding to the wireless communication device.

Configuration of a Wireless Communication Device NE41 of the Fourth Embodiment

Figure 13:
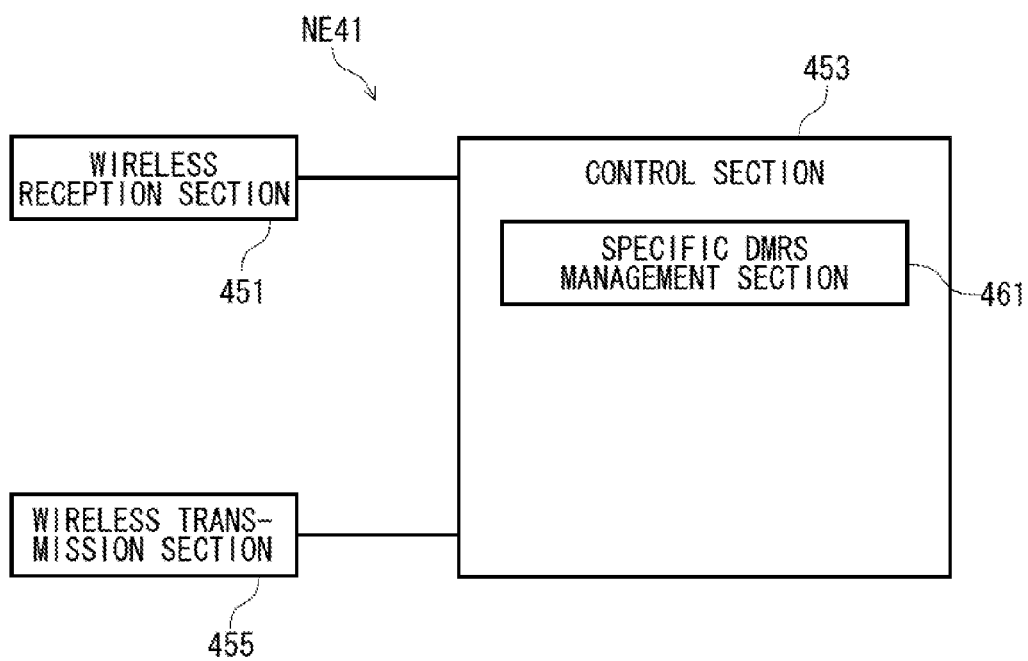
FIG. 13 is a block diagram of a wireless communication device NE41 constituting the wireless communication system of the fourth embodiment.

FIG. 13 is a block diagram of a wireless communication device NE41 constituting a wireless communication system of the fourth embodiment. As shown in FIG. 13, the wireless communication device NE41 of the fourth embodiment includes a wireless reception section 451, a control section 453, and a wireless transmission section 455. The control section 453 includes a specific DMRS management section 461.

The wireless reception section 451 receives a random access preamble, a control signal response, or the like which is transmitted from the terminal UE4, so as to output to the control section 453. Further, the wireless reception section 451 receives the UL packet transmitted from the terminal UE4 so as to output to the control section 453.

In a case where a cell provided by the wireless communication device NE41 is used as "the cell of the additional carrier type", the control section 453 determines the resource of the ePDCCH transmitted on the RB including the specific DMRS and the antenna port to which a specific DMRS is transmitted, using a method capable of detecting the terminal UE4. The control section 453 outputs information regarding the determined resource of the ePDCCH and the antenna port number to the specific DMRS management section 461. Further, the control section 453 transmits an instruction to perform precoding for all terminals on the specific DMRS or an instruction not to perform precoding on the specific DMRS, to the specific DMRS management section 461. The control section 453 generates the notification information so as to output to the wireless transmission section 455. In a case of using the specific DMRS, the control section 453 outputs a packet corresponding to the specific DMRS to the wireless transmission section 455, with performing precoding for all terminals on the packet corresponding to the specific DMRS. The control section 453 generates a random access response corresponding to a random access preamble so as to output to the wireless transmission section 455. The control section 453 generates specific control information for each terminal so as to output to the wireless transmission section 455.

The specific DMRS management section 461 uses as the specific DMRS, the DMRS of the instructed antenna port in the RB to which the resource of the ePDCCH which is input from the control section 453 is transmitted. Further, the specific DMRS management section 461 outputs the specific DMRS to the wireless transmission section 455, while the precoding for all terminals is performed or the precoding is not performed on the specific DMRS, in response to the instruction from the control section 453.

The wireless transmission section 455 transmits the specific DMRS which is input from the specific DMRS management section 461 to the terminal UE4. The wireless transmission section 455 transmits data which is input from the control section 453, notification information, specific control information, random access response, or the like to the terminal UE4.

Cell Reselection Method of the Terminal UE4 in the Fourth Embodiment

Figure 14:
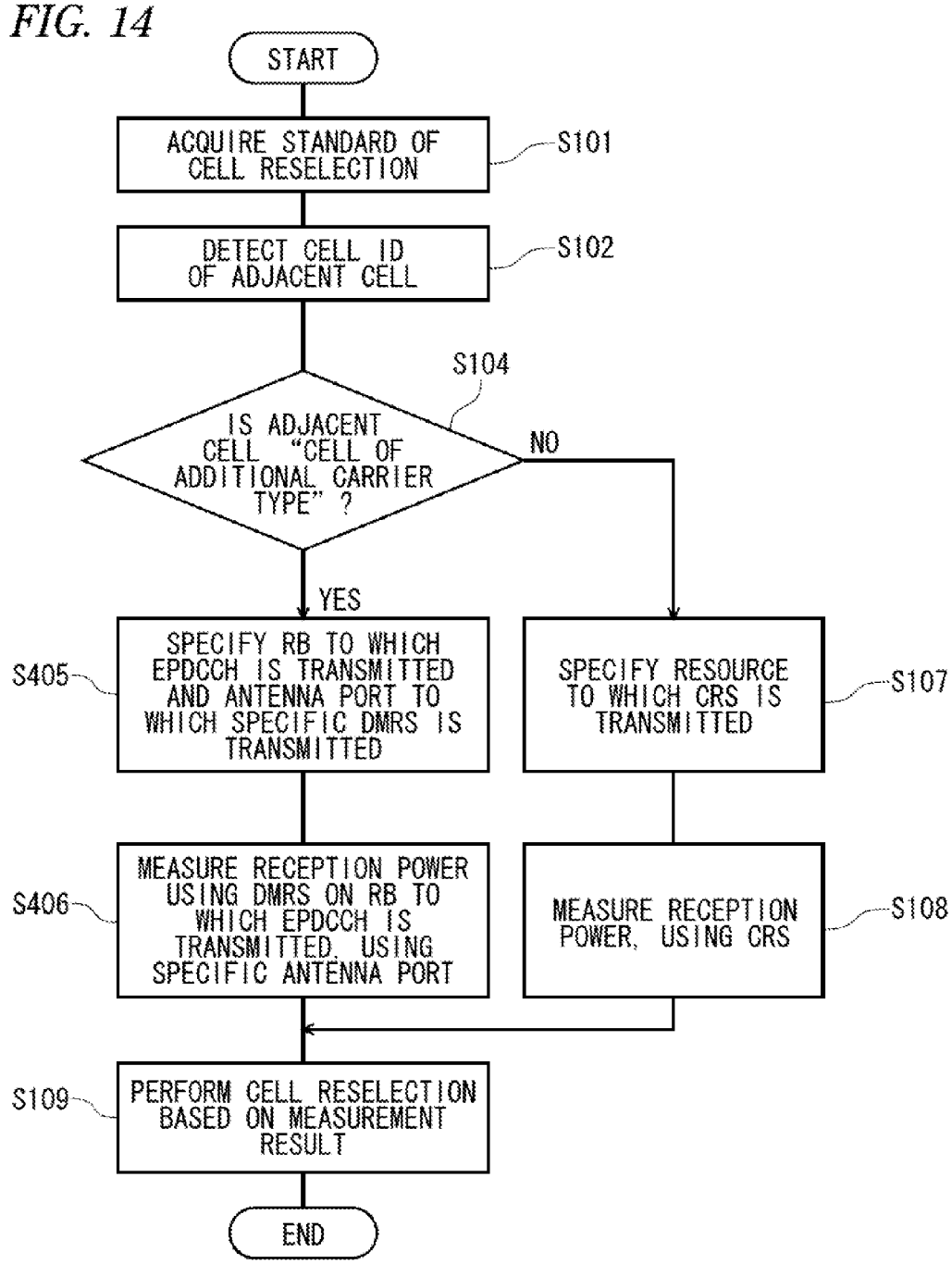
FIG. 14 is a flowchart when the terminal UE4 in the idle state performs a cell reselection in the wireless communication system of the fourth embodiment.

Hereinafter, with reference to FIG. 14, an operation when the terminal UE4 in the idle state performs a cell reselection will be described. FIG. 14 is a flowchart when the terminal UE4 in the idle state performs a cell reselection in the wireless communication system of the fourth embodiment. In addition, in FIG. 14, the same processing steps as the steps shown in FIG. 9 in the second embodiment are designated by the same reference numerals. The terminal UE4 is connected to the cell (own cell) provided by the wireless communication device NE41 and is in the idle state.

As shown in FIG. 14, the terminal UE4 acquires a standard or the like of the cell reselection using the notification information from its own cell (step S101). Next, the terminal UE4 detects a cell ID of an adjacent cell (step S102). Next, the terminal UE4 determines whether or not the adjacent cell is "the cell of the additional carrier type" (step S104). At this time, for example, the terminal UE4 attempts both a cell ID detection method for the additional carrier type and a cell ID detection method of the related art by the blind decoding, in step S102. The terminal UE4 determines whether or not the cell type is the cell of the additional carrier type, depending on the method by which the cell ID is detected. Further, after the cell type is determined to be the cell of the additional carrier type, the terminal UE4 may attempt to detect the cell ID of the cell.

In step S104, in a case where the cell type is determined to be the cell of the additional carrier type (that is, in a case of Yes), the process proceeds to step S405, but in a case where the cell type is not determined to be the cell of the additional carrier type (that is, in a case of No), the process proceeds to step S107. In step S405, the terminal UE4 specifies the RB to which the ePDCCH is transmitted and an antenna port to which a specific DMRS is transmitted. Next, the terminal UE4 measures the reception power, using the specific DMRS which is included in the RB to which the ePDCCH is transmitted, using the specific antenna port (step S406). On the other hand, in step S107, the terminal UE4 specifies the resource to which the CRS is transmitted, from the cell ID. Next, the terminal UE4 measures the reception power, using the CRS transmitted in the resource of the specified cell ID (step S108).

If the measurement of the reception power in step S406 or S108 is successful, the terminal UE4 proceeds to step S109. In step S109, the terminal UE4 performs a cell reselection, based on the measurement result of the reception power.

In this manner, since the terminal UE4 measures the specific DMRS, using the specific antenna port in the RB to which the ePDCCH is transmitted, it is possible to use the antenna port which is not used, for other purposes. Accordingly, it is possible to use the resource efficiently. In addition, in step S406, in a case where of receiving the specific DMRS, using the SFBC, it is possible to obtain a transmission diversity effect. As a result, it is possible to increase the measurement accuracy of the reception power. Further, using the same method as the above method, the terminal UE4 in the connected state may perform movement control. In other words, in step S109, the terminal UE4 prepares a measurement result report based on the measurement result of the reception power.

Further, the present embodiment may be used in combination with any other embodiment.

As described above, according to the present embodiment, the terminal UE4 measures the specific DMRS, using the specific antenna port in the RB to which the ePDCCH is transmitted. Accordingly, the antenna port which is not used can be used for transmitting the DMRS using the precoding for a specific terminal. As a result, it is possible to cause the ePDCCH or data on the same RB to have directivity and transmit it, and to use the resource efficiently. Further, in the resource of the DMRS of the antenna port which is not used, it is possible to transmit the ePDCCH or data without transmitting the DMRS.

Fifth Embodiment

A wireless communication system of the fifth embodiment will be described with reference to FIGS. 15 to 18. The wireless communication system of the fifth embodiment is different from the wireless communication system of the fourth embodiment in that data of a common search space is decoded, using the specific DMRS transmitted in the specific antenna port, a DMRS used for a UE specific search space is selected from antenna ports including the specific antenna port, and data of a UE specific search space is decoded, using the DMRS. The fifth embodiment is the same as the fourth embodiment except for the above point.

The terminal UE5 determines a cell type and specifies the resource of the ePDCCH, using the method described in the fourth embodiment. Further, the terminal UE5 identifies the resource of the packet which is transmitted in the data region and received by the terminal UE5 by performing blind decoding (BD) on the common search space and the UE specific search space which are in the ePDCCH region.

Figure 15:
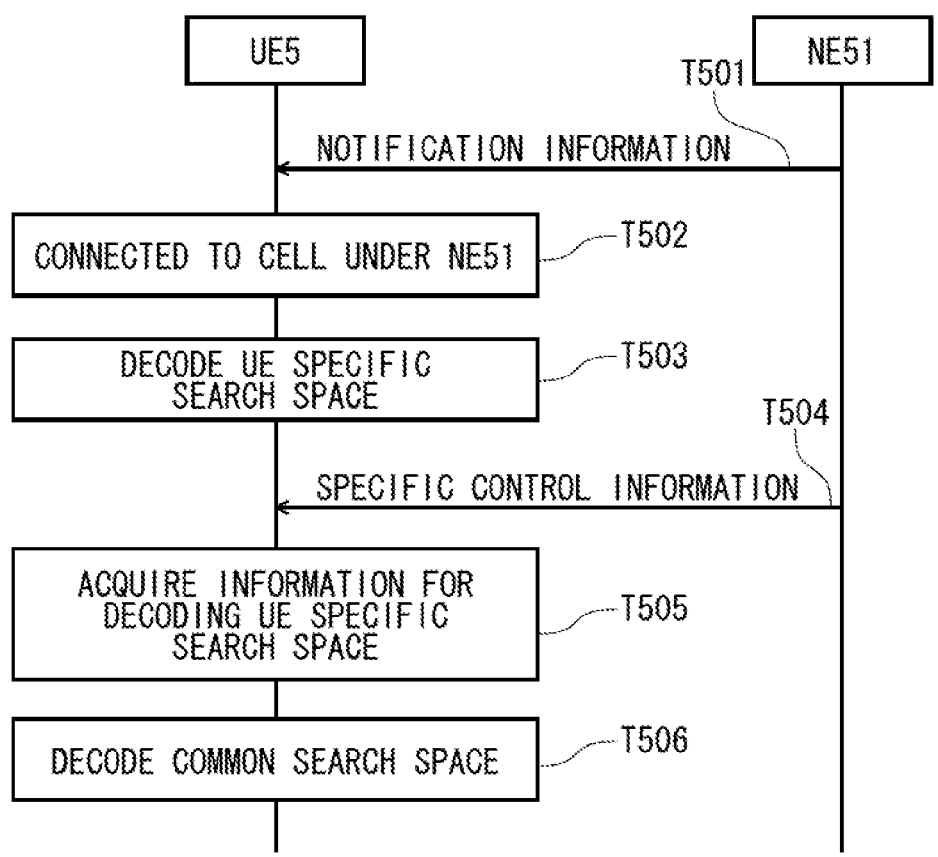
FIG. 15 is a diagram showing an example of a timing chart when a terminal UE5 decodes an ePDCCH in a wireless communication system of a fifth embodiment.

FIG. 15 is a diagram showing an example of a timing chart when a terminal UE5 decodes the ePDCCH in a wireless communication system of a fifth embodiment. As shown in FIG. 15, the terminal UE5 acquires notification information from the wireless communication device NE51 (T501). The terminal UE5 is connected to the cell under the wireless communication device NE51 and is in a connected state (T502). At this state, the terminal UE5 performs decoding of the UE specific search space, using the DMRS transmitted in the antenna port of the antenna port number which is set to a default value, while the configuration of the antenna port to which the DMRS used for decoding the UE specific search space is transmitted is obtained from the wireless communication device NE1 (T503). In addition, the default value may be the same antenna port number as the common search space, may be set in advance in the terminal UE5, or may be included in the notification information.

Next, the terminal UE5 discovers the resource to which specific control information is transmitted from the wireless communication device NE51, and acquires the specific control information (T504). The terminal UE5 acquires the antenna port number of the DMRS used in the UE specific search space, from the specific control information (T505). The terminal UE5 performs blind decoding on the common search space, using the DMRS received from the antenna port represented by the specific control information (T506).

In addition, the specific control information may be RRC, or MACCE. Further, the antenna port of the DMRS used in the UE specific search space may change at each ePDCCH, or at each group of the ePDCCHs. For example, the group is the ePDCCHs constituting Distributed ePDCCH.

Configuration of Terminal UE5 of the Fifth Embodiment

Figure 16:
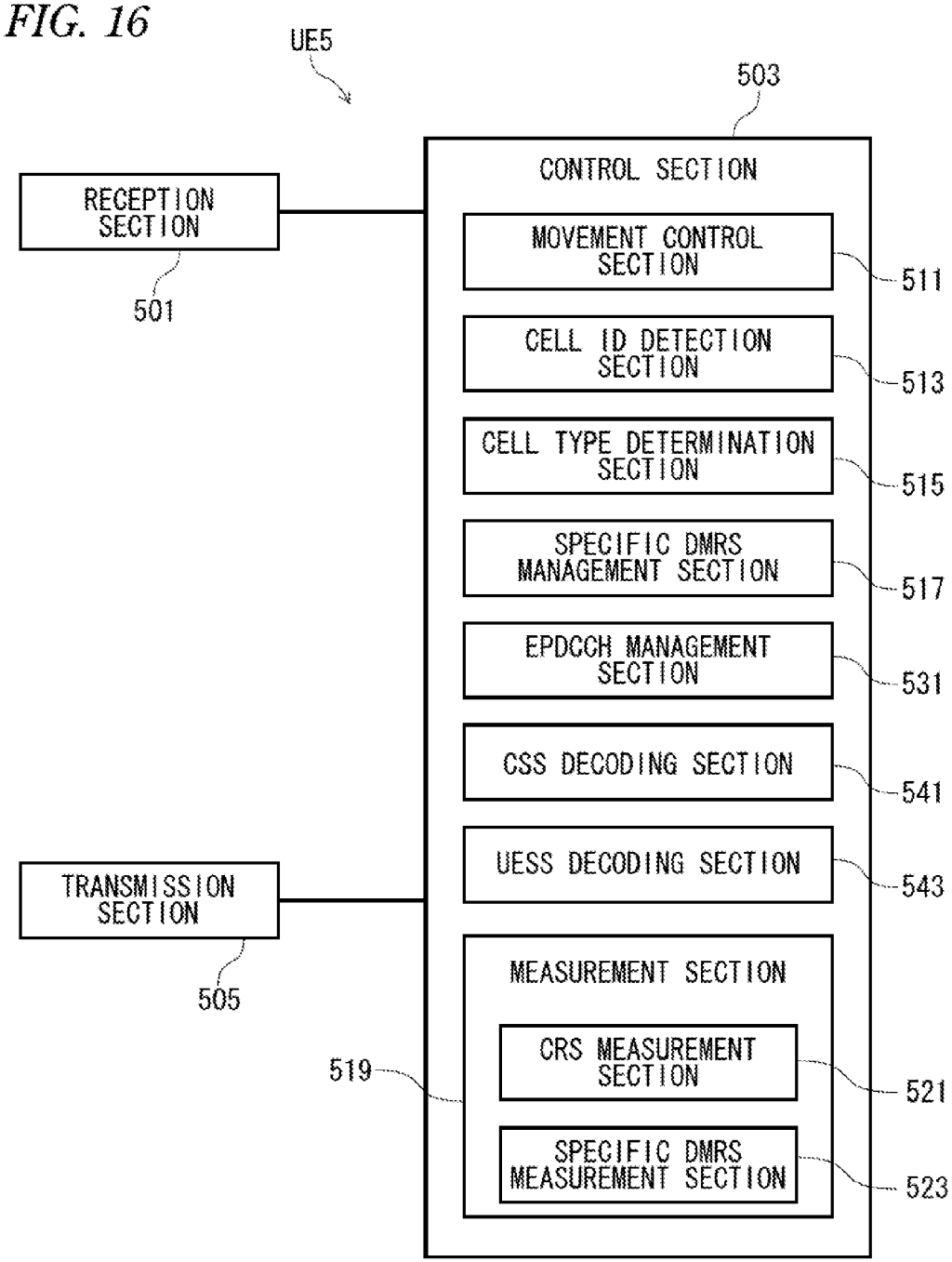
FIG. 16 is a block diagram of the terminal UE5 constituting the wireless communication system of the fifth embodiment.

FIG. 16 is a block diagram of a terminal UE5 constituting a wireless communication system of the fifth embodiment. As shown in FIG. 16, the terminal UE5 of the fifth embodiment includes a reception section 501, a control section 503, and a transmission section 505. The control section 503 includes a movement control section 511, a cell ID detection section 513, a cell type determination section 515, a specific DMRS management section 517, an ePDCCH management section 531, a CSS decoding section 541, a UESS decoding section 543, and a measurement section 519. The measurement section 519 includes a CRS measurement section 521 and a specific DMRS measurement section 523.

The reception section 501 receives, in response to an instruction from the control section 503, through the downlink of the cell to which the terminal UE5 is connected, the notification information or the control information such as specific control information. Further, the reception section 501 outputs the received control information to the control section 503. Further, the reception section 501 measures the CRS, in response to an instruction from the CRS measurement section 521 of the measurement section 519 included in the control section 503. The reception section 501 transmits the measurement result of the CRS to the CRS measurement section 521. Further, the reception section 501 measures the DMRS, in response to the instruction from the specific DMRS measurement section 523 of the measurement section 519 included in the control section 503. The reception section 501 transmits the measurement result of the DMRS to the specific DMRS measurement section 523. The reception section 501 receives the synchronization signal in response to the instruction from the cell ID detection section 513 of the control section 503. The reception section 501 transmits the received synchronization signal to the cell ID detection section 513. The reception section 501 outputs the resource of the received ePDCCH and the measured DMRS to the CSS decoding section 541 and the UESS decoding section 543. In addition, the CSS decoding section 541 may perform blind decoding and then output the resource of the ePDCCH and the DMRS to the UESS decoding section 543.

The control section 503 instructs the reception section 501 to receive the notification information or the control information such as specific control information. The control information received by the reception section 501 is input to the control section 503. Information regarding the measurement of the reception power of the cell included in the control information which is input to the control section 503 is input to the movement control section 511 of the control section 503. If the measurement of the adjacent cell is instructed from the movement control section 511, the control section 503 starts the measurement of the adjacent cell. Further, the control section 503 outputs the antenna port number information used in decoding the UE specific search space to the UESS decoding section 543. The antenna port number information includes information which is output from the specific DMRS management section 517, information which is held in advance, or information acquired from specific control information. In addition, the antenna port number information used in decoding the UE specific search space may be a table capable of determining an antenna port number in response to the position of data in the RB, may be an antenna port number itself, may or may not use an antenna port number and SFBC, or may be other information.

Hereinafter, each of components included in the control section 503 will be described.

The movement control section 511 determines whether to perform a reselection of the adjacent cell, based on control information regarding the cell reselection which is input from the control section 503 and the reception power or the reception quality of its own cell and the adjacent cell when the terminal UE5 is in the idle state. On the other hand, the movement control section 511 prepares a measurement report, based on the measurement configuration which is input from the control section 503 and the reception power or the reception quality of its own cell and the adjacent cell when the terminal UE5 is in the connected state. The measurement report prepared by the movement control section 511 is transmitted to the transmission section 505.

In a case where the cell type of its own cell is the cell (cell of the related art) notifying a PDCCH, the movement control section 511 instructs the CRS measurement section 521 of the measurement section 519 to measure the reception power or the reception quality of its own cell. On the other hand, in a case where the cell type of its own cell is "cell of the additional carrier type", the movement control section 511 instructs the specific DMRS measurement section 523 of the measurement section 519 to measure the reception power or the reception quality of its own cell.

If it is determined that it is desirable to reselect the adjacent cell when the terminal UE5 is in the idle state, the movement control section 511 outputs the determination result to the control section 503. On the other hand, if it is determined to report a measurement report based on the measurement configuration when the terminal UE5 is in the connected state, the movement control section 511 prepares the measurement report so as to output to the transmission section 505. Further, if it is determined to start the measurement of the adjacent cell based on the reception power or the reception quality of its own cell which is input from the measurement section 519 when the terminal UE5 is in the connected state, the movement control section 511 instructs the cell ID detection section 513 to detect the cell.

The cell ID detection section 513 instructs the reception section to receive the synchronization signal. The cell ID detection section 513 detects the cell ID of the adjacent cell, based on the synchronization signal which is input from the reception section. The cell ID detection section 513 outputs the detected cell ID to the cell type determination section 515. In addition, the cell ID detection section 513 acquires information necessary for detecting the cell ID of the adjacent cell (for example, a detection signal corresponding to the cell ID) from the control section 503. The cell ID detection section 513 may instruct the reception section to detect the detection signal and may detect the adjacent cell based on the detection signal received by the reception section. In this case, the control section 503 may have a method to know a detection signal corresponding to the cell ID from the notification information or the specific control information.

The cell type determination section 515 determines whether the cell type of the cell ID detected by the cell ID detection section 513 is "the cell of the additional carrier type" or the cell of the related art notifying a PDCCH. If it is determined that the cell type of the cell ID is "the cell of the additional carrier type", the cell type determination section 515 outputs the cell ID to the ePDCCH management section 531. On the other hand, if it is determined that the cell type of the cell ID is the cell of the related art, the cell type determination section 515 outputs the cell ID to the CRS measurement section 521 of the measurement section 519. If the resource of the ePDCCH is input from the ePDCCH management section 531, the cell type determination section 515 outputs the cell ID and the resource of the ePDCCH to the specific DMRS management section 517.

Hereinafter, a cell type determination method performed by the cell type determination section 515 will be described. The cell type determination section 515 determines a cell type by performing any one of the determination method examples described below.

First Determination Method Example

The cell type determination section 515 determines whether the cell type is "the cell of the additional carrier type" or the cell of the related art from frequencies.

Second Determination Method Example

In the method, the synchronization signal of the cell of the additional carrier type is different from the synchronization signal of the cell of the related art. That is, the cell of the additional carrier type uses the sequence obtained by inverting the sequence of the Primary Synchronization Signals (PSS) in the subframe number 0 and the subframe number 5. Accordingly, in a case of the cell of the additional carrier type, if the PSS of the subframe number 0 and the PSS of the subframe number 5 are added to each other, the size becomes zero, whereas if they are subtracted from each other, the size becomes double. On the other hand, in a case of the cell of the related art, if the PSS of the subframe number 0 and the PSS of the subframe number 5 are added to each other, the size becomes double, whereas if they are subtracted from each other, the size becomes zero. "The cell type determination section 515 determines whether the cell type is the cell of the additional carrier type" or the cell of the related art, based on each calculation result obtained by the addition and the subtraction of the PSS of the subframe number 0 and the PSS of the subframe number 5.

Third Determination Method Example

In the method, the synchronization signal of the cell of the additional carrier type is placed at a resource located in a position different from that of the synchronization signal of the cell of the related art. The cell type determination section 515 attempts to detect the synchronization signals of both the cell of the additional carrier type and the cell of the related art. In a case where the synchronization signal is detected, the cell type determination section 515 determines whether the cell type is the cell of the additional carrier type or the cell of the related art depending on the position of the detected synchronization signal.

Fourth Determination Method Example

The cell type determination section 515 determines whether the cell type is the cell of the additional carrier type or the cell of the related art depending on the Cyclic Redundancy Check (CRC) of the Master Information Block (MIB). The cell of the additional carrier type is configured such that the resource used in notification of MIB is different in RE level. In a case of using CRC in the cell of the related art, since the MIB of the cell of the additional carrier type becomes an error, the cell type determination section 515 can determine the type of cell.

Fifth Determination Method Example

In the method, information indicating whether or not the cell type is the cell of the additional carrier type is included in the notification information. The cell type determination section 515 determines whether or not the cell type is the cell of the additional carrier type, based on the information included in the notification information. In addition, the information included in the notification information may be a flag indicating that the cell type is the cell of the additional carrier type.

Sixth Determination Method Example

In the method, information indicating whether or not the adjacent cell is the cell of the additional carrier type is included in the notification information. In addition, the information may be a flag indicating whether or not all adjacent cells are cells of the additional carrier type. Further, the information may be an adjacent cell list indicating whether or not the cell type is the cell of the additional carrier type for each adjacent cell identifier. Further, the cell type determination section 515 may determine which one a network will notify depending on the situation. In this case, a method in which a network performs notification at Choice may be used. The cell type determination section 515 compares a cell ID detected by the cell ID detection section 513 from the synchronization signal with the adjacent cell list, and determines whether or not the cell type is the cell of the additional carrier type.

In addition, the cell type determination section 515 may determine a cell type by a method other than the methods described above.

If a cell ID is input, the CRS measurement section 521 of the measurement section 519 informs the reception section 501 of the resource of the CRS corresponding to the cell ID which is set in advance, and instructs the reception section 501 to measure the CRS. The CRS measurement section 521 calculates the reception power or the reception quality based on the measurement result of the CRS which is input from the reception section 501, and outputs the calculation result to the movement control section 511.

If the cell ID is input, the ePDCCH management section 531 derives the resource of the ePDCCH corresponding to the cell ID. In addition, the ePDCCH management section 531 outputs only the resource of the ePDCCH on the RB including the specific DMRS to the cell type determination section 515. In addition, the resource of the ePDCCH may be any value by which the specific DMRS management section 517 can specify the resource in which the specific DMRS is placed. For example, the RB number is also possible.

Hereinafter, a deriving method of the resource of the ePDCCH by the ePDCCH management section 531 will be described. The ePDCCH management section 531 specifies the resource of the ePDCCH by performing any one of the deriving methods described below.

First Deriving Method Example

The ePDCCH management section 531 holds a table or a calculation expression for deriving a resource of the ePDCCH from a cell ID. The ePDCCH management section 531 specifies the resource of the ePDCCH corresponding to the cell ID which is input, based on the table or the calculation expression.

Second Deriving Method Example

In the example, the same resource is used between cells, as the resource of the ePDCCH. In this case, the ePDCCH management section 531 specifies the resource of the ePDCCH common to the cells that is held in advance.

Third Deriving Method Example

In the example, the resource of the ePDCCH of an own cell and the resource of the ePDCCH of an adjacent cell are included in the notification information of its own cell. In this case, the ePDCCH management section 531 specifies the resource of the ePDCCH corresponding to the cell ID which is input, by receiving the notification information of its own cell.

Fourth Specification Method Example

When the terminal UE5 is in a state connected with its own cell, the terminal UE5 is notified of information regarding the resource of the ePDCCH of the adjacent cell, by specific control information transmitted from its own cell. In this case, the ePDCCH management section 531 specifies the resource of the ePDCCH corresponding to the cell ID which is input, by receiving the specific control information of its own cell.

Fifth Specification Method Example

The ePDCCH management section 531 holds a table or a calculation expression for deriving the resource of the ePDCCH. The ePDCCH management section 531 derives a list of resources in which the ePDCCH may exist, by the table or the calculation expression. The specific DMRS management section 517 specifies the resource of the ePDCCH by blind decoding the list of resources in which the ePDCCH may exist. By doing so, it is possible to place the ePDCCH having some degree of freedom.

In addition, the ePDCCH management section 531 may specify the resource of the ePDCCH, using a method other than the methods described above.

If the cell ID and the resource of the ePDCCH are input, the specific DMRS management section 517 derives an antenna port to which the specific DMRS is transmitted, in the RB transmitted in the resource of the ePDCCH. The specific DMRS management section 517 outputs the resource information including the antenna port number to which the specific DMRS is transmitted and the cell ID to the specific DMRS measurement section 523. In addition, the specific DMRS management section 517 may output information indicating whether or not reception is performed, using a Space Frequency Block Code (SFBC) to the specific DMRS measurement section 523. Further, the specific DMRS management section 517 outputs the antenna port number to which the specific DMRS is transmitted, to the CSS decoding section 541.

Hereinafter, an antenna port specification method by the specific DMRS management section 517 will be described. The specific DMRS management section 517 specifies the antenna port to which a specific DMRS is transmitted by performing any one of the specification methods described below.

First Specification Method Example

In the example, the antenna port to which a specific DMRS is transmitted is set in advance. The specific DMRS management section 517 is configured such that the specific DMRS is transmitted, using for example, the antenna port number 7.

Second Specification Method Example

In the example, the antenna port to which a specific DMRS is transmitted and whether to use a Space Frequency Block Code (SFBC) is set in advance. The specific DMRS management section is configured such that the specific DMRS is transmitted, using for example, the antenna port number 7 and the antenna port number 9, or SFBC.

Third Specification Method Example

In the example, by the notification information or the specific control information, the antenna port number to which a specific DMRS is transmitted is set. The antenna port number to which the specific DMRS is transmitted is input to the specific DMRS management section 517.

Fourth Specification Method Example

In the example, by the notification information or the specific control information, the antenna port number to which a specific DMRS is transmitted and whether to use a SFBC is set. Whether to perform reception, using the antenna port number to which the specific DMRS is transmitted and the SFBC is input to the specific DMRS management section 517.

In addition, the specific DMRS management section 517 may specify the antenna port number to which a specific DMRS is transmitted, or the like, using a method other than the methods described above.

If the cell ID and resource number including the antenna port number to which the specific DMRS is transmitted is input, the specific DMRS measurement section 523 of the measurement section 519 informs the reception section 501 of the input, and instructs the reception section 501 to measure the DMRS. In a case where there is an instruction of reception using the SFBC from the specific DMRS management section 517, the specific DMRS measurement section 523 instructs the reception section 501 to perform the reception using the SFBC. The specific DMRS measurement section 523 calculates the reception power or the reception quality based on the measurement result of DMRS which is input from the reception section 501 and outputs the calculation result to the movement control section 511.

The CSS decoding section 541 performs the blind decoding of a common search space in response to the instruction from the control section 503. The CSS decoding section 541 decodes the data of the common search space of the ePDCCH which is input from the reception section 501 using the antenna port number which is input from the specific DMRS management section 517. In a case where the control information which should be received by the terminal UE5 is transmitted with the decoded data, the CSS decoding section 541 outputs the decoded data to the control section 503.

The antenna port number to which DMRS for decoding the UE specific search space is transmitted is input to the UESS decoding section 543. The UESS decoding section 543 decodes the data of the UE specific search space of the ePDCCH which is input from the reception section 501, among DMRSs which are input from the reception section 501 or the CSS decoding section 541, using the DMRS of the specific antenna port number which is input. In a case where the control information addressed to the terminal UE5 is transmitted, the UESS decoding section 543 outputs the control information to the control section 503.

The transmission section 505 transmits a random access preamble, a control signal response, data, or the like. Further, the transmission section 505 transmits the UL packet addressed to the wireless communication device NE51, at the transmission timing corresponding to the wireless communication device.

Configuration of Wireless Communication Device NE51 of the Fifth Embodiment

Figure 17:
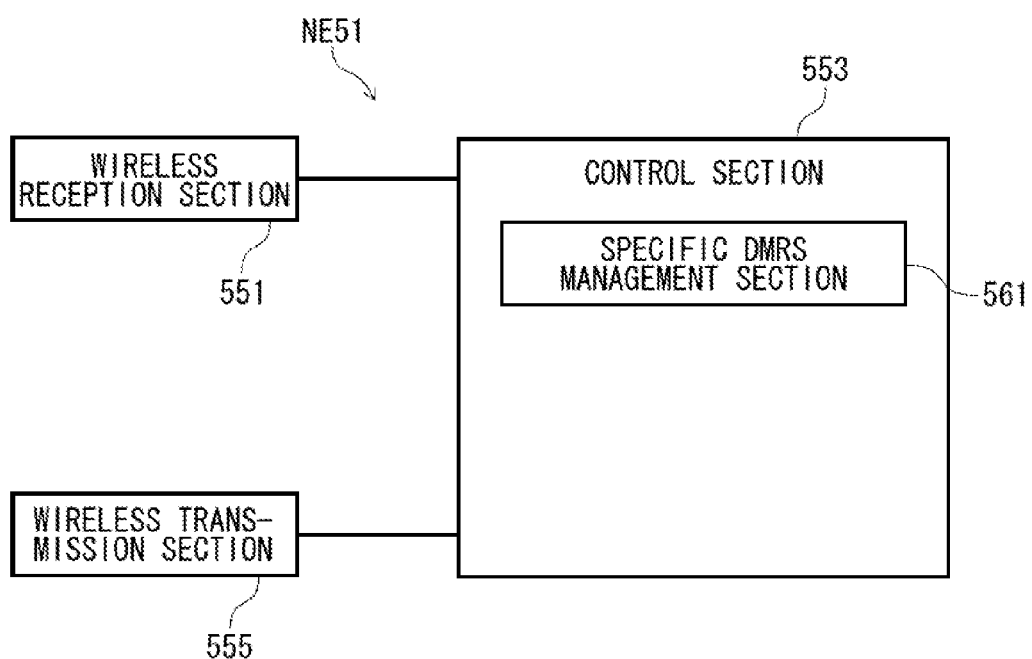
FIG. 17 is a block diagram of a wireless communication device NE51 constituting the wireless communication system of the fifth embodiment.

FIG. 17 is a block diagram of a wireless communication device NE51 constituting a wireless communication system of the fifth embodiment. As shown in FIG. 17, the wireless communication device NE51 of the fifth embodiment includes a wireless reception section 551, a control section 553, and a wireless transmission section 555. The control section 553 includes a specific DMRS management section 561.

The wireless reception section 551 receives a random access preamble, a control signal response, or the like which are transmitted from the terminal UE5 so as to output to the control section 553. Further, the wireless reception section 551 receives the UL packet transmitted from the terminal UE5 so as to output to the control section 553.

In a case where a cell provided by the wireless communication device NE51 is operated as "the cell of the additional carrier type", the control section 553 determines the resource of the ePDCCH transmitted on the RB including the specific DMRS and the antenna port to which the specific DMRS is transmitted, using a method capable of detecting the terminal UE5. The control section 553 outputs information regarding the resource of the determined ePDCCH and the antenna port number to the specific DMRS management section 561. Further, the control section 553 transmits an instruction to perform precoding for all terminals on the specific DMRS or an instruction not to perform precoding on the specific DMRS, to the specific DMRS management section 561. The control section 553 generates the notification information so as to output to the wireless transmission section 555. In a case of using the specific DMRS, the control section 553 outputs a packet corresponding to the specific DMRS to the wireless transmission section 555, with performing precoding for all terminals on the packet corresponding to the specific DMRS or without performing the precoding on the packet corresponding to the specific DMRS. The control section 553 generates a random access response corresponding to a random access preamble so as to output to the wireless transmission section 555. The control section 553 generates specific control information including information on the antenna port number, to which the DMRS used in decoding of the UE specific search space is transmitted, for each terminal so as to output to the wireless transmission section 555. The control section 553 generates control information by performing or not performing the precoding for all terminals on the common search space of ePDCCH. The control section 553 generates control information by performing the same precoding as the DMRS transmitted from the antenna port used in decoding by the terminal, on the UE specific search space of the ePDCCH. The control section 553 outputs the control information to the wireless transmission section 555.

The specific DMRS management section 561 uses as the specific DMRS, the DMRS of the instructed antenna port in the RB to which the resource of the ePDCCH which is input from the control section 553 is transmitted. Further, the specific DMRS management section 561 outputs the specific DMRS to the wireless transmission section 555 in response to the instruction from the control section 553, with performing precoding for all terminals on the specific DMRS or without performing the precoding on the specific DMRS.

The wireless transmission section 555 transmits the specific DMRS which is input from the specific DMRS management section 561 to the terminal UE5. The wireless transmission section 555 transmits data which is input from the control section 553, notification information, specific control information, random access response, or the like to the terminal UE5.

(Operation of Terminal UE5)

Figure 18:
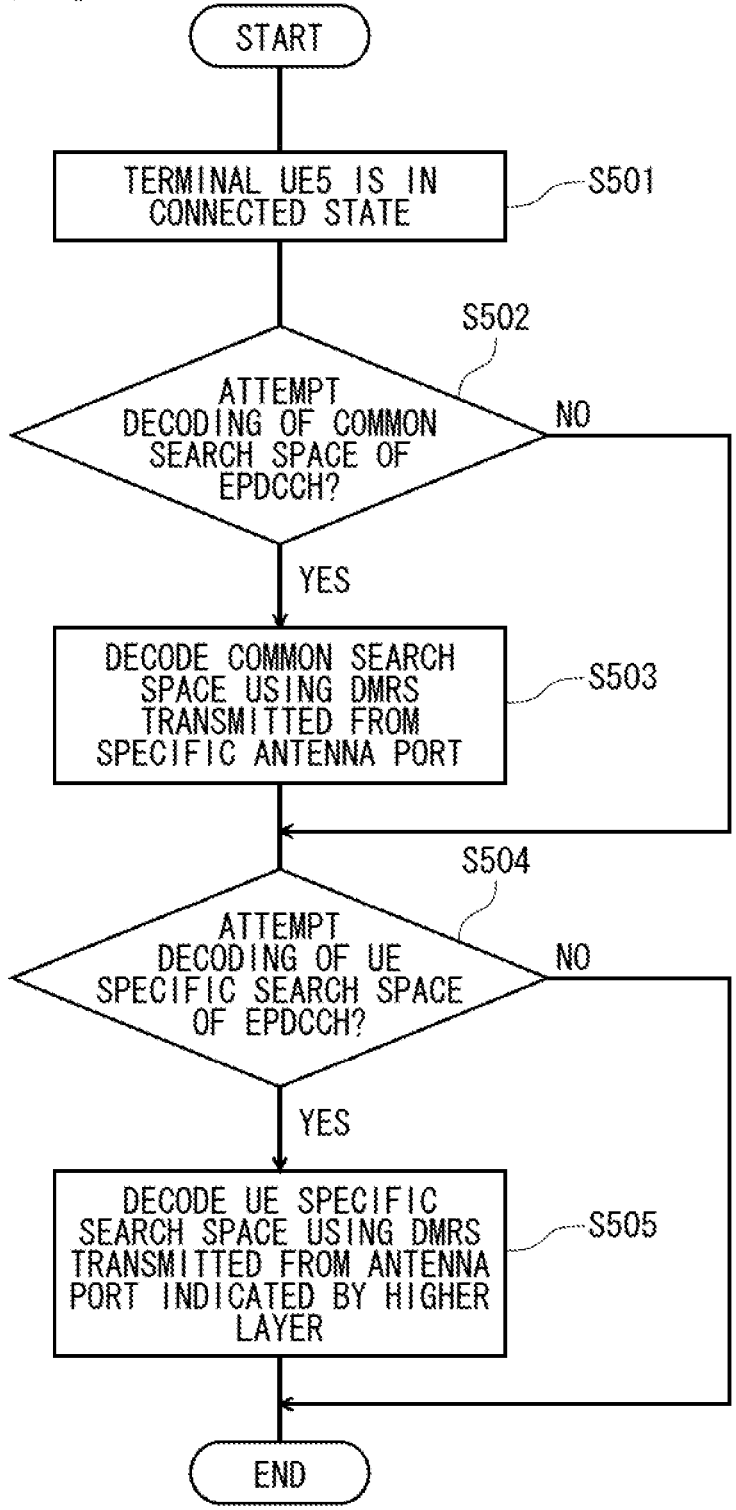
FIG. 18 is a flowchart showing an operation of the terminal UE5 in the connected state in the wireless communication system of the fifth embodiment.
Figure 19:
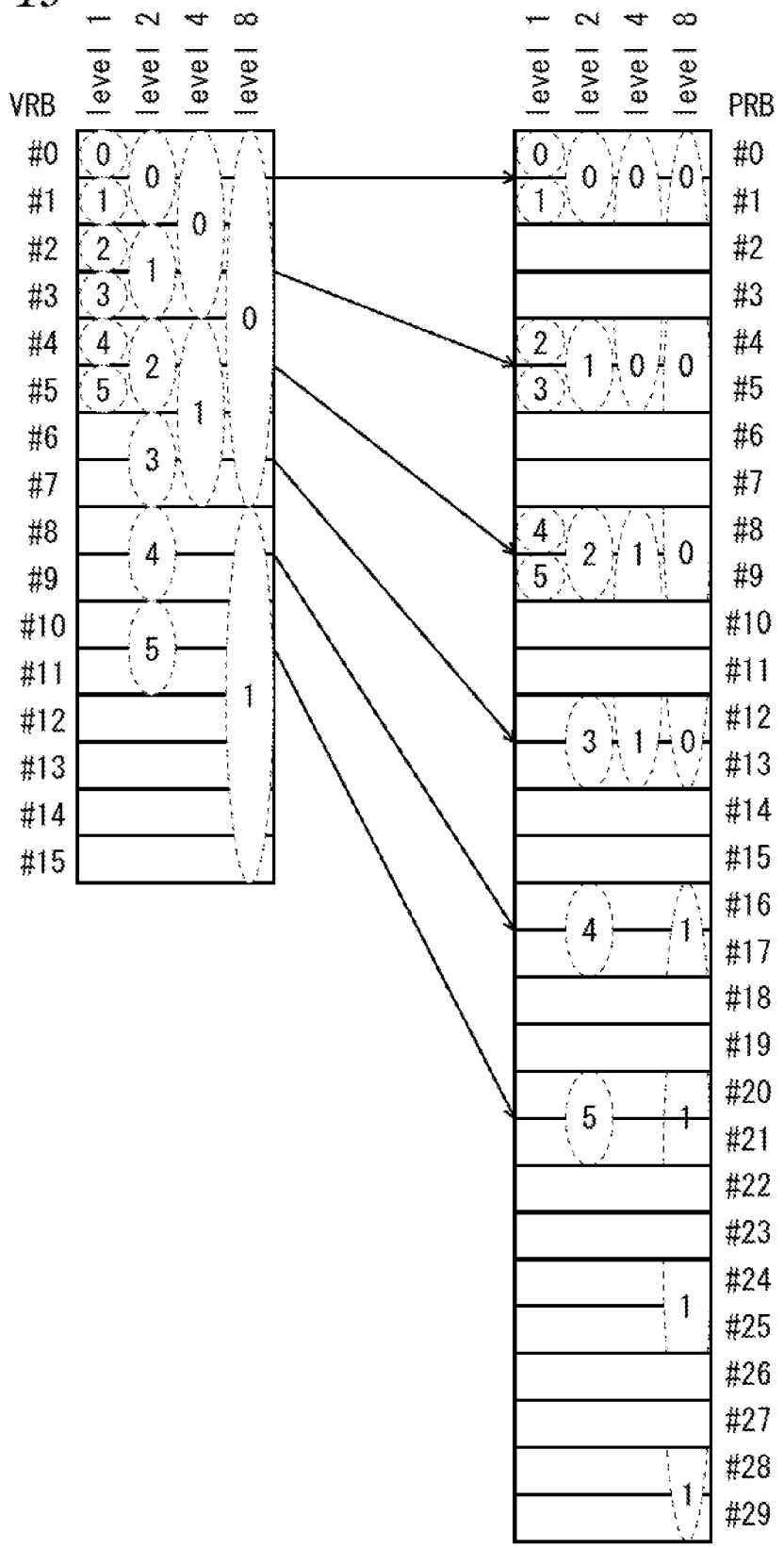
FIG. 19 is a diagram showing an example of a search space corresponding to an R-PDCCH.

Hereinafter, the terminal UE5 in the connected state will be described with reference to FIG. 18. FIG. 18 is a flowchart showing an operation of the terminal UE5 in the connected state in the wireless communication system of the fifth embodiment. As shown in FIG. 15, the terminal UE5 is in the connected state with the wireless communication device NE51 (step S501). The terminal UE5 determines whether to attempt decoding of data of a common search space of the ePDCCH (step S502).

In step S502, in a case where it is determined that the decoding of data of the common search space of the ePDCCH is attempted (that is, in a case of Yes), the process proceeds to step S503, but in a case where it is determined that the decoding is not attempted (that is, in a case of No), the process proceeds to step S504. In step S503, the terminal UE5 performs blind decoding of the common search space, using the specific DMRS transmitted from the specific antenna port. In step S504, the terminal UE5 determines whether to attempt decoding of data of the UE specific search space of the ePDCCH.

In step S504, in a case where it is determined that the decoding of data of the UE specific search space is attempted (that is, in a case of Yes), the process proceeds to step S505. In step S505, the terminal UE5 performs blind decoding on the UE specific search space, using the DMRS transmitted from the antenna port of the antenna port number indicated by a higher layer. If the control information is obtained as a result of decoding of data by the terminal UE5 in step S505, the terminal UE5 receives the data based on the control information. By doing so, the terminal UE5 can perform blind decoding of the ePDCCH.

As described above, according to the present embodiment, terminal UE5 uses the specific DMRS in decoding of data of the common search space of the ePDCCH, and uses the DMRS of the antenna ports other than the antenna port to which the specific DMRS is transmitted, for decoding of data of the UE specific search space of the ePDCCH. By doing so, without increasing the number of reference signals, the movement control and the decoding of the common search space are possible with one reference signal. Furthermore, by separating the use of antenna ports, it is possible to cause the UE specific search space of the ePDCCH to have directivity. Therefore, it is possible to perform effective use of the resource.

In addition, it is also possible to perform one-to-one mapping of antenna port and the resource on the ePDCCH.

Sixth Embodiment

A wireless communication system of the sixth embodiment will be described. In the wireless communication system of the sixth embodiment, a wireless communication device transmits CRS only in a specific resource. Then, the terminal performs measurement for movement control, using the specific resource. Examples of the specific resource may be as follows.

In the first example, the CRS is transmitted only in a first OFDM symbol. Since the measurement for movement control is performed only by the first OFDM symbol in view of MBSFN subframe, installing a terminal is facilitated. Since only the first OFDM symbol is measured, an interference control between cells can be performed more easily than in the related art. Further, since the terminal measures only the first OFDM symbol regardless of whether the cell type is "the cell of the additional carrier type" or the cell of the related art, the measurement can be performed without increasing the load on the terminal.

A second example is a method of transmitting a CRS only in a specific antenna port (for example, antenna port 1). By doing so, a frequency average and a time average can be taken, and thus the accuracy of the measurement for the movement control can be maintained.

Seventh Embodiment

A wireless communication system of the seventh embodiment will be described. In the wireless communication system of the seventh embodiment, the wireless communication device transmits a CSI-RS in response to a cell ID. The terminal performs the measurement for movement control, using a specific CSI-RS. By doing so, although there is no subframe for transmitting the CSI-RS, or the like, the CSI-RS is a few milliseconds longer in transmission interval than the CRS, and thus it is possible to apply a cell ID so as to avoid interference between cells.

Eighth Embodiment

A wireless communication system of the eighth embodiment will be described. In the wireless communication system of the eighth embodiment, the wireless communication device informs the CSI-RS of its own cell and the adjacent cell by the notification information. If the notification information is received from its own cell, the terminal knows where the CSI-RSs of its own cell and the adjacent cell are placed, and thus performs the measurement for movement control, using the CSI-RSs. In addition, the placement information of the CSI-RS of the adjacent cell included in the notification information is such that it may include only the placement information of the CSI-RS of the adjacent cell of the same frequency, but may not include the placement information of the CSI-RS of the adjacent cell of a different frequency. In this case, if the terminal wants to measure the adjacent cell of a different frequency, the terminal can know the placement information of the CSI-RS of the cell of the frequency by acquiring notification information of any one cell of a different frequency. The terminal measures the reception power of the cell of the frequency together with the information. By doing so, since the placement information of the CSI-RS of the cell of a different frequency may not be included in the notification information, the notification information can be reduced in size.

In addition, the method can be applied to the above embodiment. In other words, the notification information of its own cell includes placement information of the specific DMRS of the adjacent cell or placement information of the ePDCCH.

In addition, in each of the above embodiments, the expression of the DMRS of the RB to which the ePDCCH is transmitted is used, but a smaller unit than the RB may be used. For example, the DMRS may be replaced with a DMRS of a subcarrier to which the ePDCCH is transmitted.

Further, in each of the above embodiments, the case is described in which the DMRS of the RB to which the ePDCCH is transmitted is configured by 15 subcarriers on the frequency axis and one subframe on the time axis. However, one subframe may be replaced with slots. The DMRS may be replaced with the DMRS transmitted on the same slot in the subcarriers to which the ePDCCH is transmitted. Further, one subframe may be replaced with a single or a plurality of OFDM symbols. In this manner, it is possible to further reduce the number of DMRSs transmitted without being subjected to preceding.

In the embodiments, the cases in which the invention is realized by hardware have been described. However, the invention may be realized by software in cooperation with hardware.

Further, respective function blocks used in the description of the embodiments may be typically realized by an LSI that is an integrated circuit. They may be individually fabricated into one chip or a part or the whole of them may be fabricated into one chip. Here, although LSI is exemplified, it may be called an IC, a system LSI, a super LSI, an ultra LSI, or the like, depending on the difference in integrity.

Further, the technique for the integrated circuit is not limited to LSI, and may be realized as a dedicated circuit or a general purpose processor. After the LSI fabrication, a FPGA (Field Programmable Gate array) that can be programmed after fabrication of the LSI or a reconfigurable processor that can reconfigure the connection or setting of the circuit cells in the LSI may be used.

Further, if technique for an integrated circuit appears, which substitutes LSI with the progress of the semiconductor technology or other derived technologies, the function blocks may be integrated using the technologies. Biotechnology may be possibly adapted.

Though the antenna is used in the above embodiments, an antenna port can be used in a similar manner. The antenna port is a logical antenna including one or a plurality of physical antennas. In other words, the antenna port does not necessarily mean one physical antenna, but may sometimes mean an allay antenna having a plurality of antennas. For example, in Long Term Evolution (LTE), how many physical antennas are included in an antenna port is not prescribed, while the antenna port is determined as a minimum unit by which the base station can send a different Reference signal. In addition, the antenna port may be determined as a minimum unit to multiply weighting with a Precoding vector.

While the present invention has been described in detail, or with reference to the specific embodiments, it is apparent for those skilled in the art that the invention may be modified and changed in various manners without departing from the scope and spirit of the invention.

This invention is based on Japanese Patent Application (Japanese Patent Application No. 2012-044347) filed on Feb. 29, 2012, the content of which is incorporated herein by reference.

INDUSTRIAL APPLICABILITY

The wireless communication device according to the present invention is useful as a base station or the like transmitting a reference signal by which a wireless communication terminal measures reception power from a communication cell.

REFERENCE SIGNS LIST

UE1, UE2, UE3, UE4, UE5 Wireless communication terminal
NE11, NE12, NE21, NE22, NE3, NE41, NE42, NE51 Wireless communication device
101, 201, 401, 501 Reception section
103, 203, 403, 503 Control section
105, 205, 405, 505 Transmission section
111, 211, 411, 511 Movement control section
113, 213, 413, 513 Cell ID detection section
115, 215, 415, 515 Cell type determination section
117, 217, 417, 517 Specific DMRS management section
119, 219, 419, 519 Measurement section
121, 221, 421, 521 CRS measurement section
123, 223, 423, 523 Specific DMRS measurement section
151, 251, 451, 551 Wireless reception section
153, 253, 453, 553 Control section 155, 255, 455, 555 Wireless transmission section
161, 261, 461, 561 Specific DMRS management section
231, 431, 531 ePDCCH management section
541 CSS decoding section
543 UESS decoding section

The invention claimed is:

1. A wireless communication device transmitting a reference signal for reception by a wireless communication terminal, said wireless communication device comprising:
   a control section configured to determine whether or not a cell type of a detected cell ID is a cell of a type of transmitting the reference signal in a resource of an Enhanced Physical Downlink Control Channel (ePDCCH) region, configured to specify a resource of a data region in which a reference signal specific to the wireless communication terminal is placed, in a case where the cell type is determined to be the cell of the type of transmitting the reference signal in the resource of the data ePDCCH region, and configured to specify a resource of the data region in which a reference signal specific to the communication cell is placed, in a case where the cell type is determined not to be the cell of the type of transmitting the reference signal in the ePDCCH region; and
   a wireless transmission section configured to transmit to the wireless communication terminal the reference signal specific to the wireless communication terminal or the reference signal specific to the communication cell in the resource of a data region determined by the control section, wherein
   the reference signal specific to the wireless communication terminal and the reference signal specific to the communication cell are used to measure a reception power of signal transmitted from the communication cell in the specified resource of the data region.

2. The wireless communication device according to claim 1,
   wherein the control section performs precoding for all terminals on the reference signal specific to the wireless communication terminal.

3. The wireless communication device according to claim 1,
   wherein the reference signal specific to the wireless communication terminal is transmitted in the resource of the data region of a specific subframe.

4. The wireless communication device according to claim 1, further comprising:
   a plurality of antenna ports,
   wherein the reference signal specific to the wireless communication terminal is transmitted in the resource of the data region, using a specific antenna port among the plurality of antenna ports.

5. A wireless communication terminal which receives a reference signal, said wireless communication terminal comprising:
   a cell ID detection section configured to detect a cell ID, based on a synchronization signal from a wireless communication device;
   a cell type determination section configured to determine whether or not a cell type of a cell ID detected by the cell ID detection section is a cell of a type of transmitting the reference signal specific to the wireless communication terminal in a resource of an Enhanced Physical Downlink Control Channel (ePDCCH) region;
   a specific reference signal management section configured to specify a resource of the data region in which the reference signal specific to the wireless communication terminal is placed, in a case where the cell type is determined to be the cell of the type of transmitting the reference signal specific to the wireless communication terminal in the ePDCCH region, by the cell type determination section; and
   a reception power measurement section configured to measure reception power of the reference signal specific to the wireless communication terminal transmitted in the resource specified by the specific reference signal management section, wherein
   the wireless communication terminal uses the reference signal specific to the wireless communication terminal to measure the reception power of the reference signal specific to the wireless communication terminal transmitted from a communication cell of the wireless communication device.

6. The wireless communication terminal according to claim 5,
   wherein precoding for all terminals is performed on the reference signal specific to the wireless communication terminal.

7. The wireless communication terminal according to claim 5,
   wherein the reference signal specific to the wireless communication terminal is transmitted in the resource of the data region of a specific subframe, from the wireless communication device.

8. The wireless communication terminal according to claim 5, further comprising:
   a plurality of antenna ports,
   wherein the reference signal specific to the wireless communication terminal is transmitted in the resource of the data region, using a specific antenna port among the plurality of antenna ports, from the wireless communication device.

9. The wireless communication terminal according to claim 8, further comprising:
   a Common Search Space ("CSS") decoding section configured to decode data of a common search space transmitted in the data region, using the reference signal specific to the wireless communication terminal transmitted in the specific antenna port; and
   a User Equipment Search Space ("UESS") decoding section configured to decode data of a search space specific to the terminal transmitted in the data region, using the antenna port selected from antenna ports including the specific antenna port.

10. A reference signal transmission control method, comprising the steps of:
    transmitting a reference signal specific to a wireless communication terminal from a communication cell of a wireless communication device for reception by the wireless communication terminal;
    detecting a cell ID, based on a synchronization signal from the wireless communication device;
    determining whether or not a cell type of a detected cell ID is a cell of a type of transmitting the reference signal in a resource of an Enhanced Physical Downlink Control Channel (ePDCCH) region;
    specifying a resource of the data region in which the reference signal specific to the communication cell is placed, in a case where the cell type is determined not to be the cell of the type of transmitting the reference signal in the ePDCCH region;
    specifying the resource of the data region in which the reference signal specific to the wireless communication terminal is placed, in a case where the cell type is determined to be the cell of the type of transmitting the reference signal in the ePDCCH region, measuring a reception power of the communication cell by the wireless communication terminal using the reference signal specific to the wireless communication terminal in the specified resource of the data region.

11. The reference signal transmission control method according to claim 10,
wherein precoding for all terminals is performed on the reference signal specific to the wireless communication terminal.

12. A reference signal processing method, comprising the steps of:
receiving by a wireless communication terminal a reference signal specific to the wireless communication terminal for measuring reception power of a signal transmitted from a communication cell of a wireless communication device;
detecting a cell ID, based on a synchronization signal from the wireless communication device;
determining whether or not a cell type of a detected cell ID is a cell of a type of transmitting the reference signal in a resource of an Enhanced Physical Downlink Control Channel (ePDCCH) region;
specifying a resource of the data region in which the reference signal specific to the wireless communication terminal is placed, in a case where the cell type is determined to be the cell of the type of transmitting the reference signal in the ePDCCH region;
specifying the resource of the data region in which the reference signal specific to the communication cell is placed, in a case where the cell type is determined not to be the cell of the type of transmitting the reference signal in the ePDCCH region; and
measuring reception power of the reference signal specific to the wireless communication terminal transmitted or the reception power of the reference signal specific to the communication cell in the specified resource of the data region.

13. The reference signal processing method according to claim 12,
wherein precoding for all terminals is performed on the reference signal specific to the wireless communication terminal.

14. A reference signal processing method, comprising the steps of:
receiving by a wireless communication terminal a reference signal specific to the wireless communication terminal for measuring reception power of a signal transmitted from a communication cell of a wireless communication device;
detecting a cell ID, based on a synchronization signal from the wireless communication device;
determining whether or not a cell type of a detected cell ID is a cell of a type of transmitting the reference signal in a resource of an Enhanced Physical Downlink Control Channel (ePDCCH) region;
specifying a resource of the data region in which the reference signal specific to the communication cell is placed, in a case where the cell type is determined not to be the cell of the type of transmitting the reference signal in the ePDCCH region;
specifying the resource of the data region in which the reference signal specific to the wireless communication terminal is placed, in a case where the cell type is determined to be the cell of the type of transmitting the reference signal in the ePDCCH region; and
measuring reception power of the reference signal specific to the wireless communication terminal transmitted or the reception power of the reference signal specific to the communication cell in the specified resource of the data region.

* * * * *